United States Patent [19]

Kuwahara

[11] Patent Number: 5,481,451
[45] Date of Patent: Jan. 2, 1996

[54] AC-TO-AC POWER INVERTER APPARATUS FUNCTIONING WITHOUT SMOOTHING CAPACITOR, AND CONTROL METHOD THEREOF

[75] Inventor: Naruto Kuwahara, Tokyo, Japan

[73] Assignee: Arex Electronics Corporation, Tokyo, Japan

[21] Appl. No.: 145,907

[22] Filed: Oct. 29, 1993

[30] Foreign Application Priority Data

Oct. 30, 1992 [JP] Japan .................................. 4-332126
Oct. 30, 1992 [JP] Japan .................................. 4-332127

[51] Int. Cl.$^6$ ................... H02M 5/45; H02M 1/12; H02P 5/34
[52] U.S. Cl. .................. 363/37; 363/41; 318/801
[58] Field of Search .......................... 363/34, 37, 39, 363/40, 41, 43, 45, 46, 131, 132; 318/801, 803, 808, 810, 811, 812

[56] References Cited

U.S. PATENT DOCUMENTS

| | | | |
|---|---|---|---|
| 4,802,077 | 1/1989 | Fujii et al. ............................. | 363/41 |
| 4,876,637 | 10/1989 | Mose et al. ............................ | 363/37 |
| 4,933,828 | 6/1990 | Ogawa et al. .......................... | 363/37 |
| 5,204,606 | 4/1993 | Kuwahara et al. ..................... | 318/800 |
| 5,231,339 | 7/1993 | Kishimoto et al. .................... | 318/807 |
| 5,241,256 | 8/1993 | Hatanaka et al. ...................... | 318/801 |
| 5,375,050 | 12/1994 | Nakata et al. .......................... | 363/41 |
| 5,414,615 | 5/1995 | Kumar et al. ........................... | 363/41 |

*Primary Examiner*—Matthew V. Nguyen
*Attorney, Agent, or Firm*—Jordan and Hamburg

[57] ABSTRACT

An AC-to-AC power inverter apparatus and a control method thereof are described in which the effects of AC ripple contained in an intermediate DC voltage produced in the apparatus are eliminated from the output AC voltage, thereby enabling the inverter apparatus to function without a large-capacitance smoothing capacitor. The amplitude of the DC voltage, including the AC ripple amplitude, is detected, the amplitude of a reference AC waveform is divided by the detected amplitude, and the value of the resultant ratio is applied to control the duty factor of a PWM signal, which controls a DC-to-AC inverter circuit. Changes in the DC voltage due to AC ripple are thereby prevented from affecting the output AC voltage obtained, which has an average value waveform corresponding to the reference waveform.

13 Claims, 17 Drawing Sheets

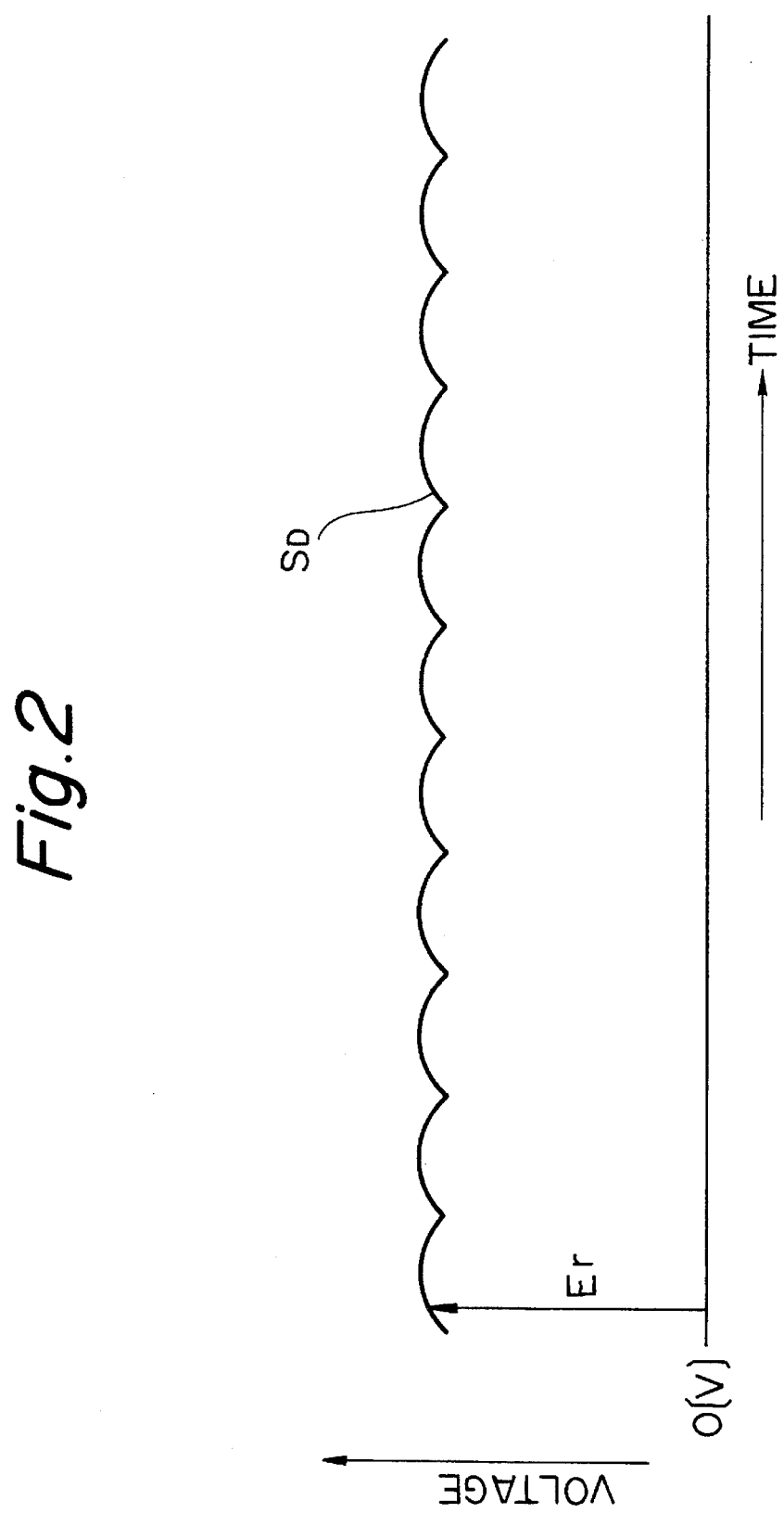

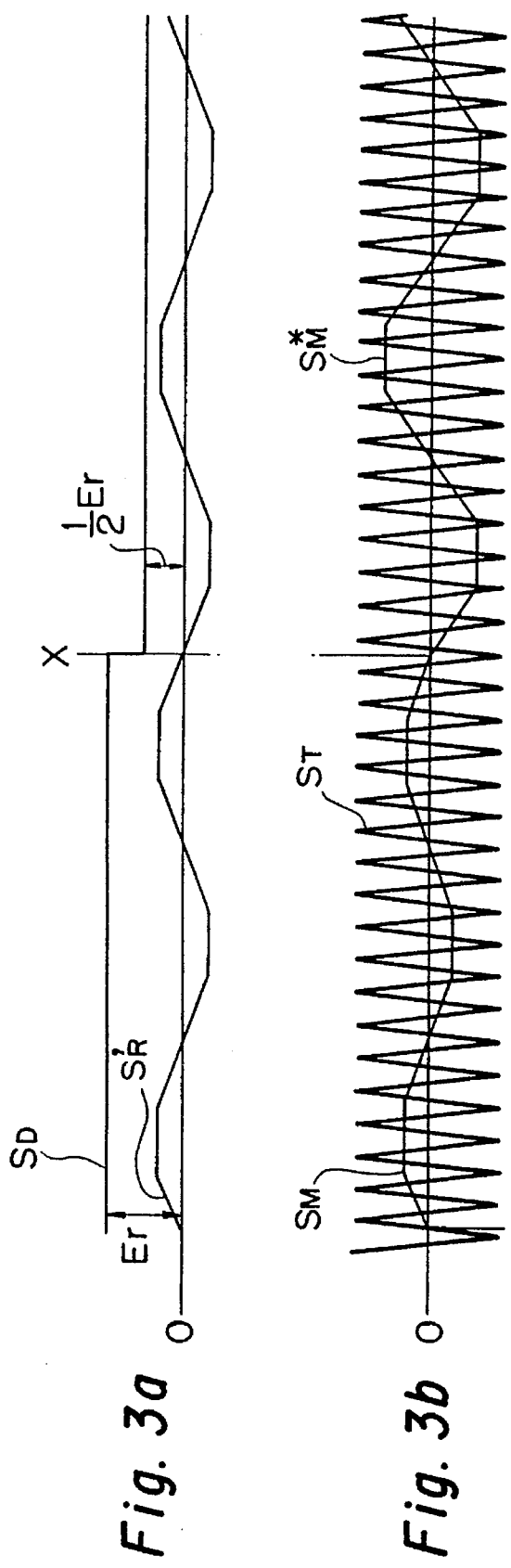
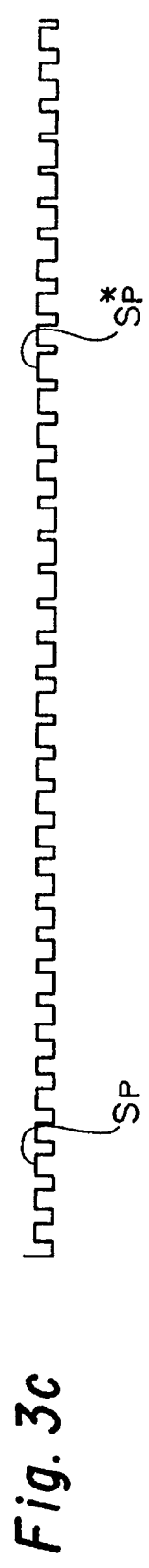
Fig. 3a
Fig. 3b
Fig. 3c

Fig. 13a  $I_R$
Fig. 13b  $I_1$
Fig. 13c  $I_2$
Fig. 13d  $I_3$
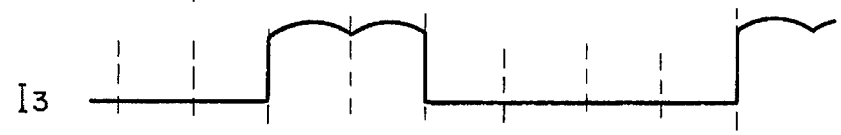
Fig. 13e  $I_4$
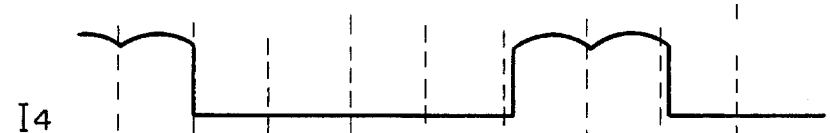
Fig. 13f  $I_5$
Fig. 13g  $I_6$
Fig. 13h  $B_1$
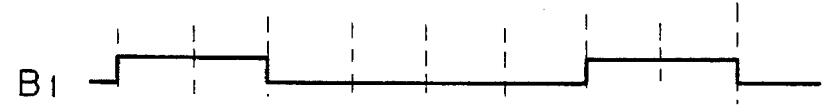
Fig. 13i  $B_2$
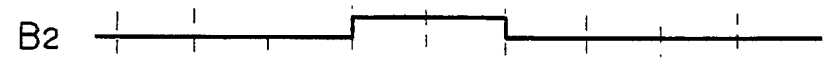
Fig. 13j  $B_3$
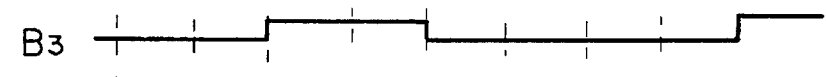
Fig. 13k  $B_4$
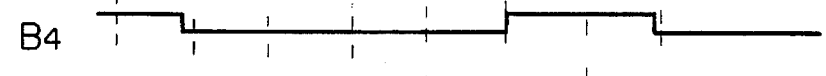
Fig. 13l  $B_5$
Fig. 13m  $B_6$
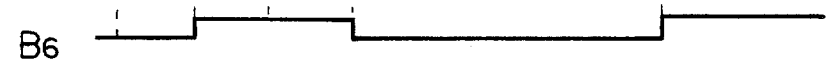

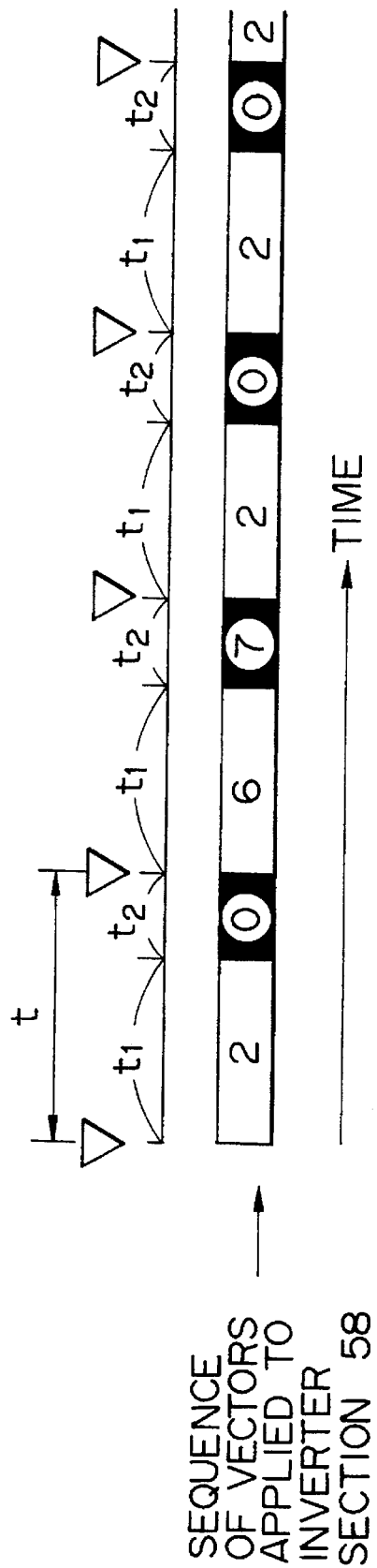

1

AC-TO-AC POWER INVERTER APPARATUS FUNCTIONING WITHOUT SMOOTHING CAPACITOR, AND CONTROL METHOD THEREOF

BACKGROUND OF THE INVENTION

1. Field of Applicable Technology

The present invention relates to an AC-to-AC power inverter apparatus (referred to in the following simply as an AC inverter apparatus) for converting an AC power source voltage to an output AC power supply voltage whose amplitude can be controlled.

In particular, the invention relates to an AC power inverter apparatus in which the AC power source voltage is first converted to a DC voltage which is supplied to a DC-to-AC inverter circuit, but whereby it becomes unnecessary to utilize a large-value smoothing capacitor for eliminating AC ripple components of the DC voltage.

2. Prior Art Technology

With prior art types of AC inverter apparatus, in which a pulse width modulation (hereinafter referred to as PWM) method is generally utilized for controlling the effective amplitude of the output AC voltage, it is necessary to provide a large-capacity electrolytic capacitor connected across the DC voltage in order to smooth out the AC ripple components of that voltage. However the use of such a capacitor results in various disadvantages, as follows:

(a) A large-capacitance electrolytic capacitor which must withstand a high level of DC voltage has a relatively limited operating lifetime. Thus, the effective operating lifetime of the AC inverter apparatus as a whole will in general be determined by that of the smoothing capacitor.

(b) Breakdown of such a capacitor can cause serious damage to other components of the AC inverter apparatus, since leakage of corrosive electrolyte may occur, or the capacitor may even explode.

(c) It may be necessary to also use a large-value inductive reactor in conjunction with such a capacitor. As a result, the overall size and weight of the AC power inverter apparatus are increased. If such a reactor is not utilized, i.e. the rectified DC voltage is applied directly from the rectifier section across the terminals of the smoothing capacitor, then excessively large values of out-of-phase current may flow (as AC components superimposed on the DC voltage), causing the power factor to become poor. This makes it difficult to achieve power saving by improving the power factor of the inverter apparatus.

(d) It is necessary for the rectifier circuit components to have sufficient drive capability for providing the high levels of current which are required to charge the smoothing capacitor at each time of connecting the AC power source to the AC inverter apparatus. Such a current drive capability is required only at the time of power switch-on, being unnecessary during normal operation of the AC inverter apparatus.

(e) It is necessary to provide some means for discharging the smoothing capacitor after power to the AC inverter apparatus is switched off. This is because the capacitor has a large value of capacitance and will remain charged to a dangerously high voltage for a substantial time after power is switched off, unless such discharging means are provided.

(f) The smoothing capacitor occupies a relatively large amount of space within the AC inverter apparatus, thereby reducing the freedom available for mechanical design of the apparatus, and causing the overall size of the AC inverter apparatus to be large.

SUMMARY OF THE INVENTION

It is an objective of the present invention to overcome the problems of the prior art set out above, by providing an AC inverter apparatus which does not require the use of a smoothing capacitor for removing AC ripple components of a DC voltage produced in the AC-to-DC-to AC conversion process, and so also does not require a large-value inductive reactor, with the waveform of the output AC supply voltage produced by the inverter apparatus being controlled such as to eliminate the effects of the AC ripple components.

To achieve the above objectives, according to a first aspect, the invention provides an AC power inverter apparatus for converting an input AC voltage supplied from an AC power source to an output AC voltage, comprising:

AC-to-DC converter means for converting the input AC voltage to a DC voltage having AC ripple components;

amplitude detection means for deriving an amplitude detection signal, the amplitude detection signal varying in accordance with changes in amplitude of the DC voltage;

reference waveform generating means for generating a reference waveform signal, the reference waveform signal varying in accordance with changes in amplitude of a reference waveform;

operational means for operating on the reference waveform signal and amplitude detection signal to obtain a ratio signal, the ratio signal varying in amplitude in accordance with a ratio of the amplitude of the reference waveform to the amplitude of the DC voltage;

pulse width modulation signal generating means for operating on the ratio signal to generate a pulse width modulation signal, the pulse width modulation signal varying in duty factor in accordance with changes in the amplitude of the ratio signal; and A DC-to-AC inverter circuit, controlled by the pulse width modulation signal for converting the DC voltage to the output AC voltage;

the DC-to-AC inverter circuit being controlled by the pulse width modulation signal such as to compensate the amplitude of the output AC voltage for changes in the DC voltage amplitude, to thereby compensate against the ripple components.

The above-mentioned pulse width modulation signal generating means preferably comprises:

triangular waveform generating means for generating a triangular waveform signal having a fixed period; and a comparator circuit for comparing the triangular waveform signal with the ratio signal, to obtain the pulse width modulation signal.

The above-mentioned operational means preferably comprises divider means for dividing amplitude values expressed by the reference waveform signal by amplitude values expressed by the amplitude detection signal.

The amplitude detection signal may be an analog signal varying in amplitude in proportion to the DC voltage amplitude, the reference waveform signal may be an analog signal varying in amplitude in proportion to the reference waveform amplitude, and the triangular waveform signal may be an analog waveform signal, with the comparator means being formed of an analog voltage comparator.

Alternatively, the apparatus can further include analog-to-digital conversion means for converting the amplitude detection signal to successive digital data expressing successive sample values of instantaneous amplitude of the DC voltage, with the reference waveform generating means functioning to generate the reference waveform signal as successive digital data expressing successive values of instantaneous amplitude of the reference waveform, with the triangular waveform generating means being formed of a reversible counter circuit for generating cyclically increasing and decreasing digital data values as the triangular waveform signal, and with the comparator means being formed of a digital comparator.

According to a second aspect, the invention provides an AC power inverter apparatus for converting an input AC voltage supplied from an AC power source to an output AC voltage, comprising:

AC-to-DC converter means for converting the input AC voltage to a DC voltage having AC ripple components;

amplitude detection means for deriving an amplitude detection signal, the amplitude detection signal varying in accordance with changes in amplitude of the DC voltage;

analog-to-digital converter means for converting the amplitude detection signal to digital data;

a DC-to-AC inverter circuit formed of a plurality of controllable switching elements, for converting the DC voltage to the output 3-phase AC voltage, and supplying respective phases thereof to three output terminals;

reference vector memory means having stored therein data representing a reference pattern of vectors, the pattern corresponding to a reference waveform of the output 3-phase AC voltage, the vectors including unit length vectors and zero length vectors, each zero length vector representing a condition of zero potential difference between respective phases of the output 3-phase AC voltage;

a microcomputer coupled to take in, at successive time points recurring with a fixed period, a detected digital amplitude value from the analog-to-digital converter means, a preset amplitude factor, and a unit length vector read out from the reference vector memory means, for producing during a first portion of the fixed period a combination of control signals in accordance with the unit length vector, for then reading out from the reference vector memory means a zero length vector and producing during a second portion of the fixed period a combination of control signals in accordance with the zero length vector, and for determining the ratio of the first and second portions in accordance with a ratio of the preset amplitude factor to the detected amplitude value; and a drive circuit coupled to the DC-to-AC inverter circuit and responsive to each combination of control signals for setting the plurality of switching elements to a combination of states in accordance with the combination of control signals;

the microcomputer functioning during each of the fixed periods to increase the second time period portion in relation to the first portion in accordance with an increase in the DC voltage amplitude as expressed by the detected amplitude value, for thereby compensating the output 3-phase AC voltage against the ripple components.

According to a third aspect, the invention provides an AC-to-AC power inverter apparatus wherein an input AC voltage from an AC power source is converted to a DC voltage by a regenerative rectifier circuit, with the DC voltage being converted to an AC output voltage by DC-to-AC inverter means, wherein the regenerative rectifier circuit comprising:

a plurality of main rectifier diodes interconnected to form a main rectifier circuit, for transferring power from the AC power source to the DC-to-AC inverter circuit by forward current flow through the rectifier diodes;

a plurality of current transfer elements each connected in parallel with a corresponding one of the rectifier diodes; and synchronizing means operating in synchronism with the input AC voltage from the AC power source, for controlling each of the current transfer elements to selectively permit transfer of power from the DC-to-AC inverter means to the AC power source by current flow through the current transfer elements in the inverse direction to the forward current flow.

According to a fourth aspect, the invention provides a method of operating a control circuit of an AC power inverter apparatus, the AC power inverter apparatus including an AC-to-DC converter circuit for converting an input AC voltage from a power supply source to a DC voltage having AC ripple components, and a DC-to-AC inverter circuit, the DC-to-AC inverter circuit being controlled by a pulse width modulation drive signal produced from the control circuit to convert the DC voltage to an output AC voltage while compensating the output AC voltage against effects of the AC ripple components, the method comprising execution at each of periodic intervals of a sequence of steps of:

(a) obtaining a detected instantaneous amplitude value proportional to the DC voltage;

(b) reading out, from a memory, one of a sequence of stored reference waveform instantaneous amplitude values;

(c) obtaining a preset amplitude factor indicative of a desired amplitude of the output AC voltage;

(d) calculating the product of the reference waveform amplitude value and the amplitude factor, and dividing the product by the detected amplitude value (Er) to obtain a ratio value;

(e) comparing the ratio value with a current count value of a counter whose count state is successively incremented and successively decremented in alternating intervals, to obtain a comparison value; and (f) latching the comparison value in a latch circuit to thereby obtain the pulse width modulation signal as an output signal from the latch circuit, with the pulse width modulation signal having a duty factor which decreases in accordance with an increase in the DC voltage resulting from the ripple components.

According to a fifth aspect, the invention provides a method of operating a control circuit of an AC power inverter apparatus, the AC power inverter apparatus including an AC-to-DC converter circuit for converting an input AC voltage from a power supply source to a DC voltage having AC ripple components, and a DC-to-AC inverter circuit formed of a plurality of switching elements, for converting the DC voltage to an output 3-phase AC voltage, the method comprising execution in each of successive intervals recurring with a fixed period of a sequence of steps of:

(a) obtaining a detected amplitude value proportional to the DC voltage;

(b) obtaining data representing one unit length vector of a reference pattern of vectors, the reference pattern expressing a reference waveform of the output 3-phase AC voltage;

(c) obtaining a preset amplitude factor indicative of a desired amplitude of the output 3-phase AC voltage;

(d) generating a combination of drive signals determined in accordance with the unit length vector, during a first portion of the fixed period, determining the duration of the first portion in proportion to the ratio of the amplitude factor to the detected amplitude value, and supplying the drive signals to establish a corresponding combination of states of the switching elements during the first portion of the fixed period;

(e) obtaining data representing a zero length vector, corresponding to a condition of zero potential difference between respective phases of the output 3-phase voltage; and (f) generating a combination of drive signals determined in accordance with the zero length vector, and supplying the drive signals to establish a corresponding combination of states of the switching elements during a remaining portion of the fixed period.

BRIEF DESCRIPTION OF THE DRAWINGS

FIG. 2 illustrates AC ripple components of a DC voltage generated in the apparatus of FIG. 1;

FIG. 3 is a waveform diagram for illustrating output voltage compensation operation of the first embodiment, based on control of a PWM signal;

FIGS. 6, 7 are corresponding diagrams assuming that ripple components are present and that no compensation against the ripple is applied, while

FIG. 13 is a waveform diagram illustrating the operation of the regenerative rectifier circuit of FIG. 12;

FIG. 21 is a diagram to illustrate how a unit length vector and a zero length vector are successively applied during respective first and second portions of each of successive fixed periods.

DESCRIPTION OF PREFERRED EMBODIMENTS

Figure 1:
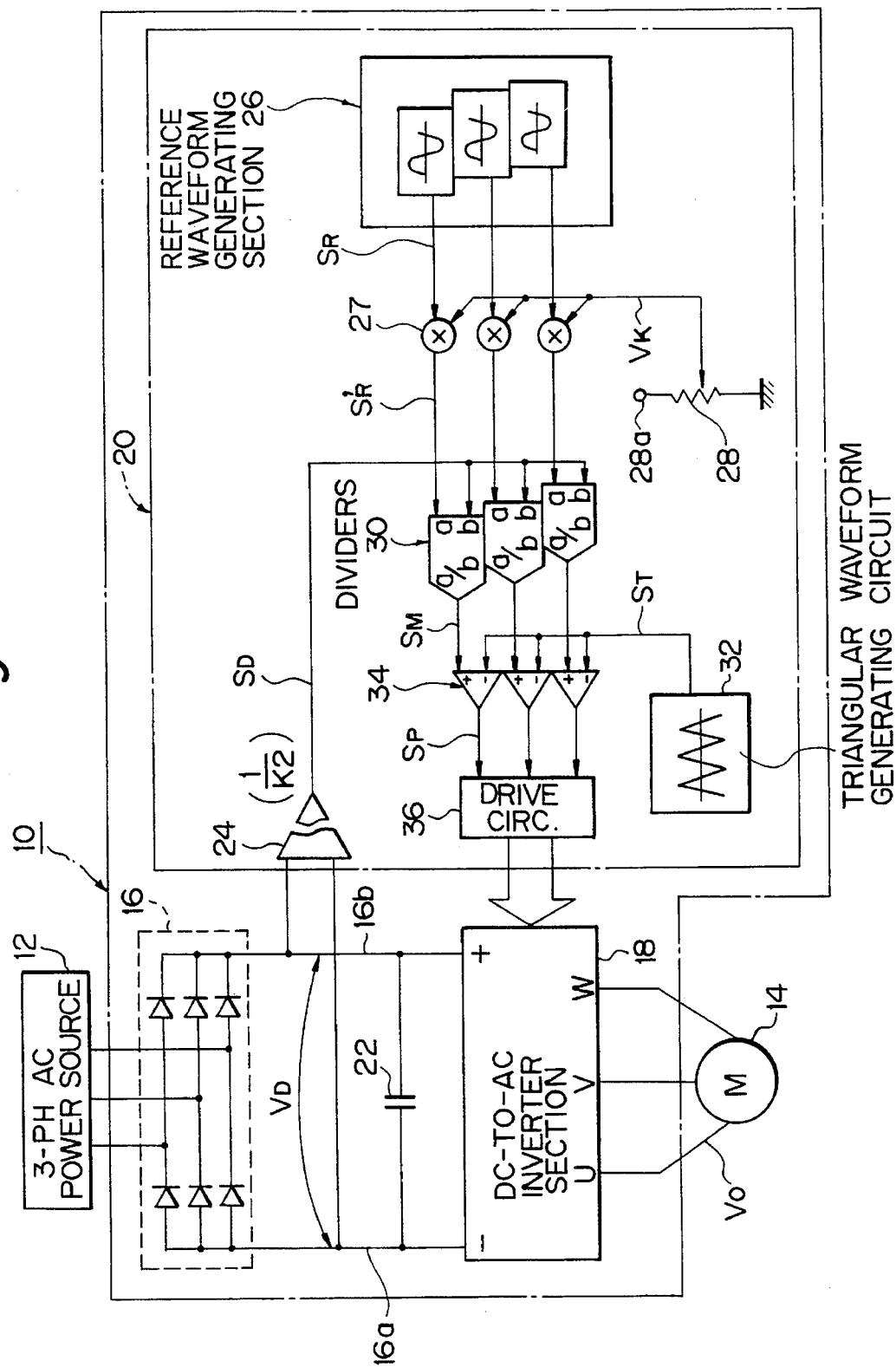
FIG. 1 is a block circuit diagram of a first embodiment of an AC inverter apparatus according to the present invention.

A first embodiment of an AC inverter apparatus according to the present invention will be described referring to FIG. 1. In FIG. 1, an AC power inverter apparatus 10 is connected between an AC power source 12 and an induction motor 14. The inverter apparatus 10 essentially consists of a 3-phase full-wave rectifier circuit 16, a control section 20 and a DC-to-AC inverter section 18. The rectifier circuit 16 converts the 3-phase AC supply voltage from the AC power source 12 to a DC voltage $V_D$ having AC ripple components superimposed thereon. The DC-to-AC inverter section 18 converts that DC voltage to an output 3-phase AC voltage Vo whose frequency and amplitude can be varied. The control section 20 controls the DC-to-AC inverter section 18 such as to determine the frequency and amplitude of the output 3-phase AC voltage Vo and such as to compensate that output 3-phase AC voltage against effects of the ripple components of the DC voltage $V_D$ from the rectifier circuit 16, and against variations in amplitude of that DC voltage which may result from fluctuations in the AC voltage from the AC power source The AC inverter apparatus 10 also includes a small-value capacitor 22 which is connected between the supply leads 16a, 16b which carry the DC voltage from the rectifier circuit 16. However it should be clearly understood that the capacitance value of the capacitor 22 is substantially lower than a value which would be required to produce any significant attenuation of AC ripple components of the DC voltage $V_D$. The function of the capacitor 22 is solely that of surge absorption, i.e. to protect the circuit elements of the apparatus against the effects of any high-voltage transients (voltage spikes) which may be generated at the output from the rectifier circuit 16. The function and nature of the capacitor 22 are thus entirely different from those of the large-capacitance electrolytic capacitor which is utilized for DC voltage smoothing in a conventional type of AC inverter apparatus.

The control section 20 includes an operational element functioning as a voltage detector 24, which acts as an attenuating buffer between the main circuit supply leads 17a, 17b and the internal circuits of the control section 20. The detector 24 attenuates the amplitude of the voltage $V_D$ by a fixed factor K2, producing as output an amplitude detection signal (designated as $S_D$) which varies in level in proportion to the amplitude of voltage $V_D$ (i.e. the potential difference between the lines 16a, 16b), and which varies with respect to ground potential of the control section 20. The instantaneous amplitude of the signal $S_D$ will be designated as Er (V), so that the instantaneous amplitude of the voltage $V_D$ is K2·Er (V).

The control section 20 further includes a circuit 26 which generates a set of three-phase fixed-amplitude reference waveform signals $S_R$, i.e. mutually differing in phase by 120° having a reference waveform which will be assumed to be sinusoidal but could also for example be trapezoidal. The instantaneous amplitude of each of these reference signals $S_R$ is designated as Vi (V). With an AC inverter apparatus according to the present invention, the output AC supply voltage produced from the DC-to-AC inverter section 18 is controlled to closely follow the reference waveform. The control section 20 further includes a reference voltage generating circuit 28, which produces an adjustable DC voltage $V_K$ that is supplied to an amplitude setting section 27, formed of respective multipliers for operating on the reference signals $S_R$. The circuit 28 can be formed, as shown, of a potentiometer coupled to a terminal 28a, with a fixed reference voltage (not shown) applied to that terminal. The value of $V_K$ defines an amplitude factor K1 which determines the amplitude of the output AC voltage from the inverter circuit 18, by determining the instantaneous amplitude of reference signals $S_R'$ which are produced from the section 27 in response to signals SR, as K1·Vi (V).

These 3-phase reference signals $S_R'$ are supplied to respective "a" input terminals of corresponding ones of a set of three dividers 30, while the detection signal $S_D$ from the buffer element 24 is supplied to each of respective "b" input terminals of the dividers 30. Each of the dividers 30 functions to divide the value of the input voltage supplied to the "a" input terminal by the voltage value supplied to the "b" input terminal, to produce a resultant output voltage signal, with these output signals being designated as $S_M$. Each of these signals $S_M$ therefore is modulated by the detected ripple components contained in detection signal $S_D$, i.e. is a ratio signal whose instantaneous amplitude is the ratio K1·Vi/Er. These ratio signals $S_M$ from the dividers 30 are supplied to respective "+" input terminals of a set of three comparators 34, while a triangular waveform voltage signal $S_T$ having a fixed amplitude and fixed period, generated by a triangular waveform signal generating circuit 32, is supplied to each of respective "−" input terminals of the comparators 34. The resultant set of three comparison output signals (designated as $S_p$) from the comparators 34 constitute respective PWM control signals for the three voltage phases produced by the DC-to-AC inverter section 18 (from the output terminals thereof designated as U, V and W), and are supplied to respective inputs of a drive section 36. The drive section 36 generates drive signals for controlling operation of the DC-to-AC inverter section 18, i.e. converts the comparison output signals $S_p$ to a suitable signal level for driving respective switching elements within the DC-to-AC inverter section 18. The drive section 36 also functions to isolate the circuits within control section 20 from the high voltages of the inverter section 18.

FIG. 2 is a waveform diagram illustrating the detected output signal $S_D$ from the detector 24, which varies in level in proportion to the ripple-superimposed DC voltage $V_D$ from the rectifier circuit 16. As shown, a substantial amplitude of AC ripple is superimposed on the rectified DC voltage, since no smoothing capacitor is utilized.

The operation of the control section 20 can be understood more clearly from the operating waveforms which are shown in diagrams (a), (b) and (c) of FIG. 3. For simplicity of description, the waveforms for only one of the three phases of the AC output voltage are shown. In FIG. 3, diagram (a) illustrates a change in level of the detection signal $S_D$, and also the waveform of one of the amplitude-adjusted reference signals $S_R'$ from the amplitude setting section 27. In order to make the effects of a change in the level of $S_D$ as clear as possible, it is assumed that the reference waveform is trapezoidal rather than sinusoidal. It is also assumed for ease of understanding that there is a sudden change in level of the detection signal $S_D$ at a time point indicated as X, with the level changing (from Er to Er/2) to half of its preceding value at that point. Diagram (b) in FIG. 3, illustrates the triangular waveform signal $S_T$, together with the waveform of the one of the output signals $S_M$ from the dividers 30. Prior to the point X, the instantaneous amplitude value of the signal $S_M$ is obtained by multiplying the instantaneous reference signal value K1·Vi by the inverse of the instantaneous amplitude of detection signal $S_D$, i.e. is K1·Vi/Er, whereas after the point X the instantaneous amplitude of the signal $S_M$ is changed to 2·K1·Vi/Er, i.e. the signal $S_M$ is doubled in amplitude, as illustrated by the waveform portion designated as $S_M^*$. The resultant waveform of the PWM signal $S_p$ is illustrated in diagram (c) of FIG. 3. In each positive-going half cycle of the reference signal waveform, the PWM signal $S_p$ switches from a high (H) level to a low (L) level each time that the instantaneous amplitude of the signal $S_M$ becomes more positive than that of the triangular waveform signal $S_T$, and switches from the L level to the H level each time the instantaneous amplitude of the signal $S_M$ becomes more negative than that of the triangular waveform signal $S_T$. The inverse is true in each negative-going half cycle of the reference signal $S_M$, i.e. the PWM signal $S_p$ switches to the L level each time that the signal $S_M$ becomes more negative than the triangular waveform signal $S_T$.

Respective PWM control signals $S_p$ for the three voltage phases generated by the DC-to-AC inverter section 18 are each derived as shown in FIG. 3, in parallel, by the control section 20, and corresponding drive signals supplied by the drive section 36 to control respective switching elements (not shown in the drawing) for the three phases, within the inverter section 18.

It can be understood from FIG. 3, by comparing the H level intervals of the PWM signal $S_p$ during each positive half-cycle of the reference signal $S_M$ waveform prior to the time point X with the durations of the corresponding H level intervals subsequent to the point X, that as a result of the reduction in amplitude of the detection signal $S_D$ (i.e. reduction in amplitude of the voltage $V_D$ from the 3-phase rectifier circuit 16) following the point X, the durations of these H level intervals of the PWM signal $S_p$ are increased (as indicated by $S_p^*$) in response to the reduction in level of $S_D$, i.e. the duty factor of the signal $S_p$ is increased in accordance with a reduction in amplitude of the detection signal $S_D$. Hence, the duty factor of the PWM output voltage Vo from the DC-to-AC inverter section 18 will be similarly increased, and hence the average amplitude of output voltage Vo will be increased, thereby compensating for the reduction in the amplitude of $V_D$.

Such compensation is applied in parallel to each of the three phases of the output AC voltage from the inverter section 18. The waveform and amplitude of the output AC voltage are thereby stabilized against the effects of changes in the amplitude of DC voltage produced from the rectifier circuit 16, irrespective of whether such changes result from AC ripple components of that DC voltage or from fluctuations in the AC power source voltage.

Figure 4:
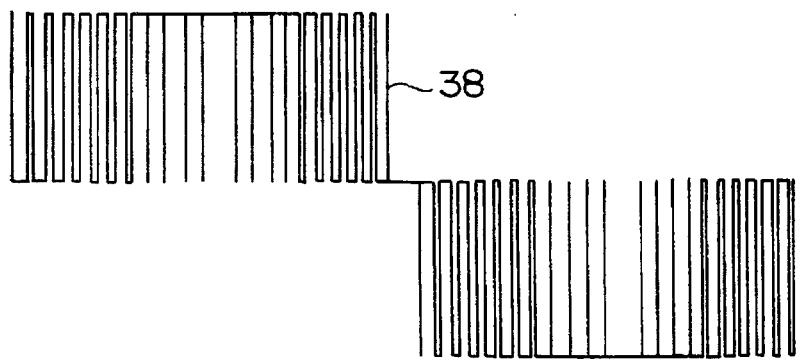
FIGS. 4, 5 are waveform diagrams respectively showing the PWM waveform and average waveform of one AC output voltage phase of the first embodiment, assuming the case of no ripple components in the DC voltage.
Figure 5:
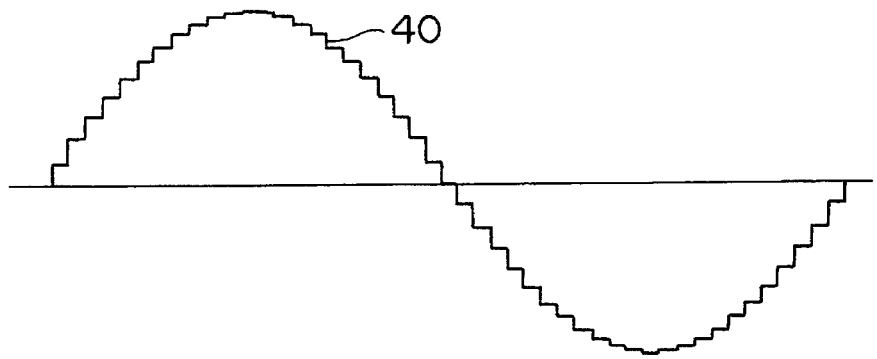

FIG. 4 is a waveform diagram in which 38 designates one phase of the output AC voltage Vo produced from the DC-to-AC inverter section 18 in response to the PWM drive signals supplied from the drive section 36, for the case of using a sinusoidal reference waveform from the reference waveform generating section 26, and assuming that the voltage 38 is not affected by ripple components of the DC voltage $V_D$. Only the waveforms for one phase are shown. The waveform of the average value of the output voltage Vo in that case is shown in FIG. 5, designated by numeral 40. As shown, this closely approximates to a sine wave, so that the motor 14 is driven in effect by a sine wave generating power source.

Figure 6:
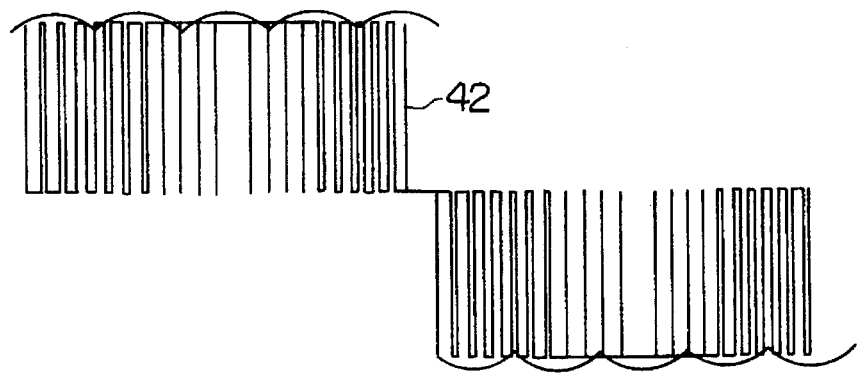
Figure 7:
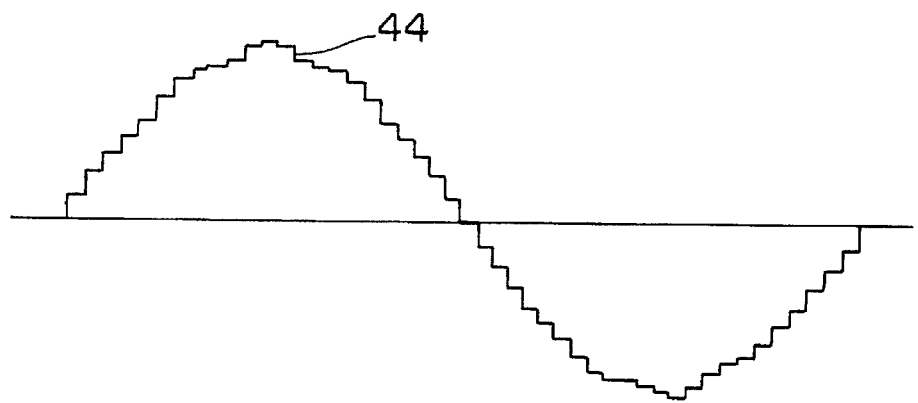

In FIG. 6, in which the output voltage Vo from the DC-to-AC inverter section 18 is designated by numeral 42, it is assumed that there is an AC ripple component 41 superimposed on the DC voltage $V_D$ and hence on the output voltage Vo, and that no compensation is applied. Hence the resultant average voltage waveform 44 of voltage Vo, shown in FIG. 7, is substantially distorted due to the effects of the AC ripple component 41.

Figure 8:
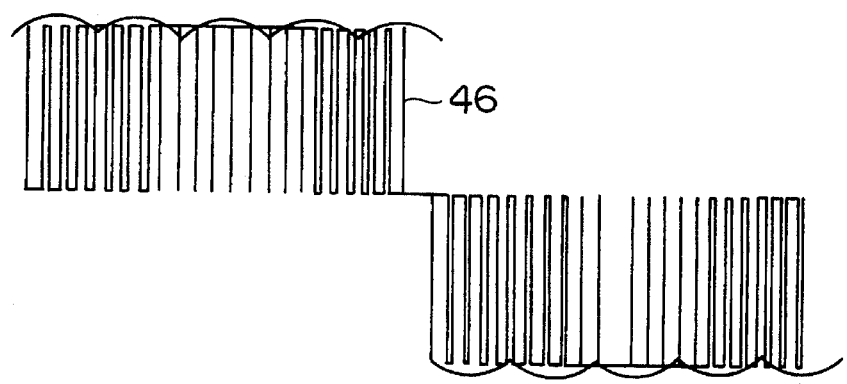
FIGS. 8, 9 are corresponding diagrams assuming that ripple components are present and that compensation against the ripple is applied.
Figure 9:
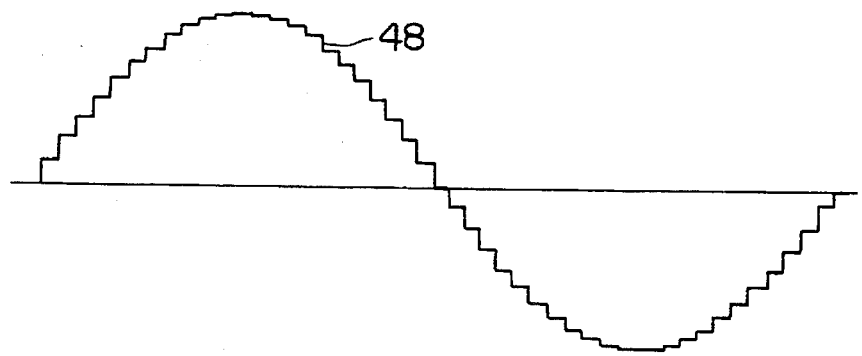

In the waveform diagram of FIG. 8, it is again assumed that there is an AC ripple component 41 superimposed on the PWM output voltage Vo, designated as 46. However in this case compensation of the PWM drive signals is applied as described above, so that the duty factor of the PWM output voltage Vo is decreased in accordance with each increase in ripple component amplitude. As a result, the average voltage waveform of the output voltage Vo, designated by numeral 48 in FIG. 9, closely approximates the reference sinusoidal waveform.

It can thus be understood that with the first embodiment described above, the effects of ripple components of the DC voltage from the 3-phase rectifier circuit 16 are effectively eliminated from affecting the waveform of the AC supply voltage produced from the DC-to-AC inverter section 18, and that this is achieved without the need to provide a large-value smoothing capacitor to achieve such elimination of ripple voltage effects.

In the first embodiment described above, a usual three-phase full-wave rectifier circuit 16 is used to produce the DC voltage from the 3-phase AC power source voltage. A second embodiment will be described referring to the block diagram of FIG. 10, which differs only from the first embodiment in utilizing a regenerative rectifier circuit 56 in place of the rectifier circuit 16. With a regenerative rectifier circuit, any reverse EMF which may be generated by the motor 14 during certain operating modes and transferred back through the switching elements of the DC-to-AC inverter circuit 18 to be superimposed on the DC voltage from the rectifier circuit, is absorbed by the AC power source 12. That is to say, energy which may be momentarily generated by the motor 14 under certain operating conditions will be fed back to the AC power source 12. As a result, fluctuations in the level of the DC voltage from the rectifier circuit can be substantially reduced. With a capacitorless type of AC power inverter apparatus, this is an advantage, since it becomes less necessary for the apparatus to compensate for randomly occurring changes in the DC voltage amplitude, as opposed to compensating mainly for the AC ripple components of the DC voltage.

Figure 10:
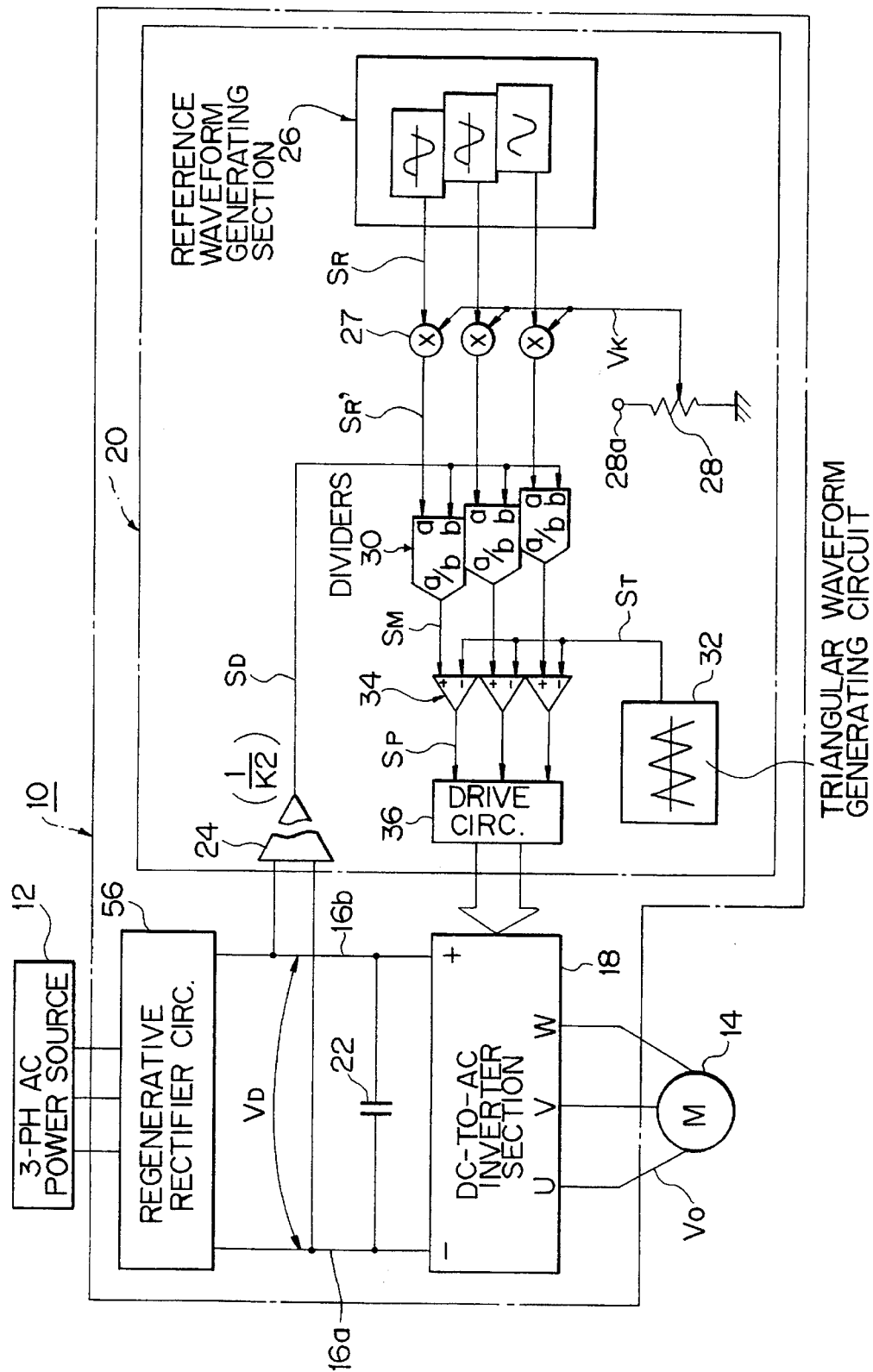
FIG. 10 is a block circuit diagram of a second embodiment of an AC inverter apparatus according to the present invention, incorporating a regenerative rectifier circuit.
Figure 11:
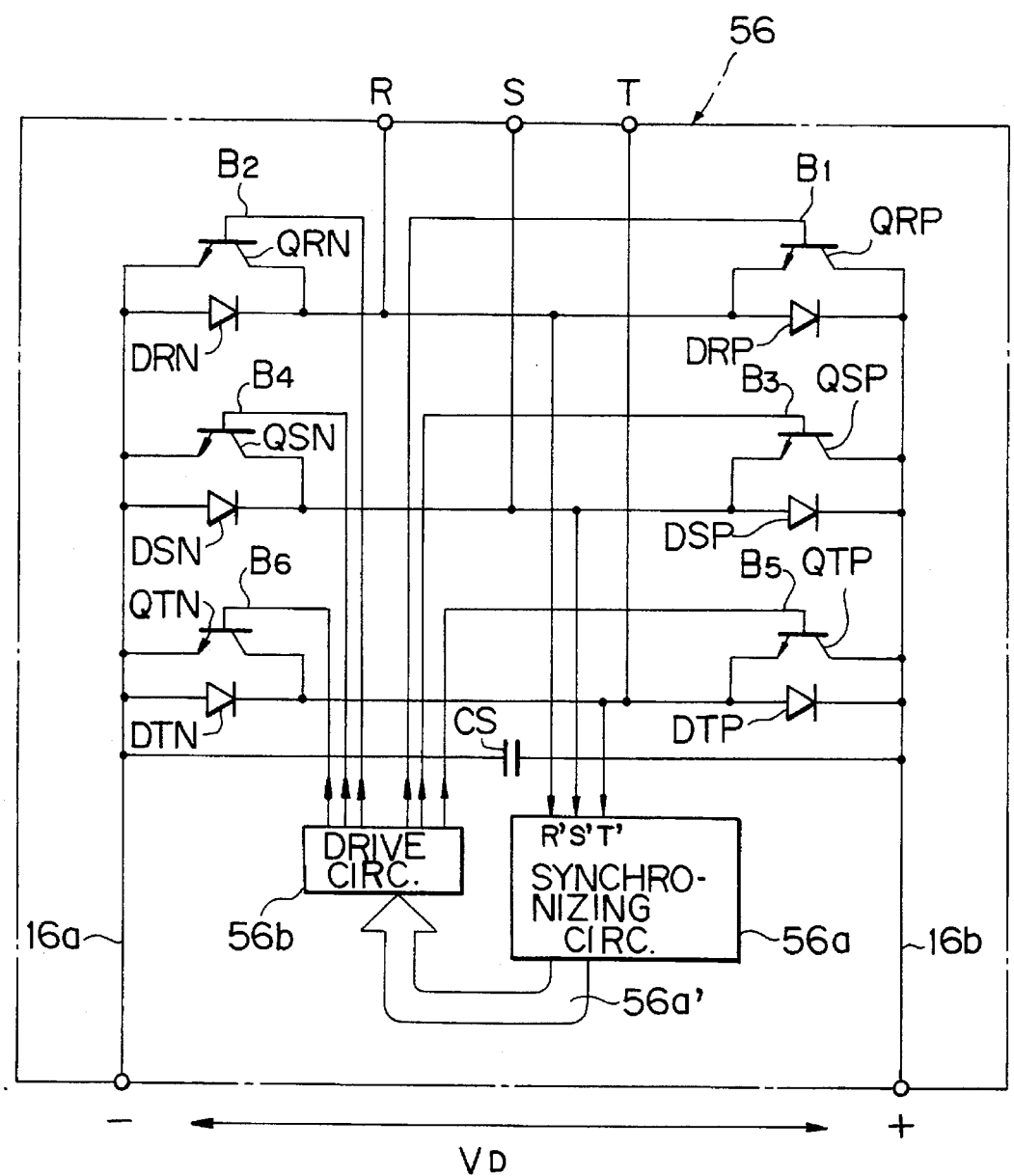
FIG. 11 is a circuit diagram of the regenerative rectifier circuit of the second embodiment.

FIG. 11 is a circuit diagram of a preferred embodiment of a regenerative rectifier circuit 56 according to the present invention, for use in the circuit of FIG. 10. In FIG. 11, the three AC phase voltages are respectively applied to three input terminals designated as R, S and T of the regenerative rectifier circuit 56. The regenerative rectifier circuit 56 is made up of six transistors QRP, QSP, QTP, QRN, QSN, QTN, used as current transfer elements for transferring energy back from the inverter circuit 18 to the AC power source 12, which have their respective emitter-collector paths shunted by respective main rectifier diodes DRP, DSP, DTP, DRN, DSN and DTN. Each of these diodes is connected for forward conduction in the opposite direction to collector-to-emitter conduction by the corresponding transistor. The regenerative rectifier circuit 56 also includes a synchronizing circuit 56a which generates control signals 56a' which are supplied to a drive circuit 56b. The circuit 56b generates a corresponding set of six base drive signals designated B1 to B6, which are applied to respective base inputs of the transistors QRP, QSP, QTP, QRN, QSN, QTN as shown. The diodes DRP, DSP, DTP, DRN, DSN and DTN are connected to the three AC phase voltages from the input terminals R, S, and T in a usual 3-phase full-wave rectifier arrangement.

Figure 12:
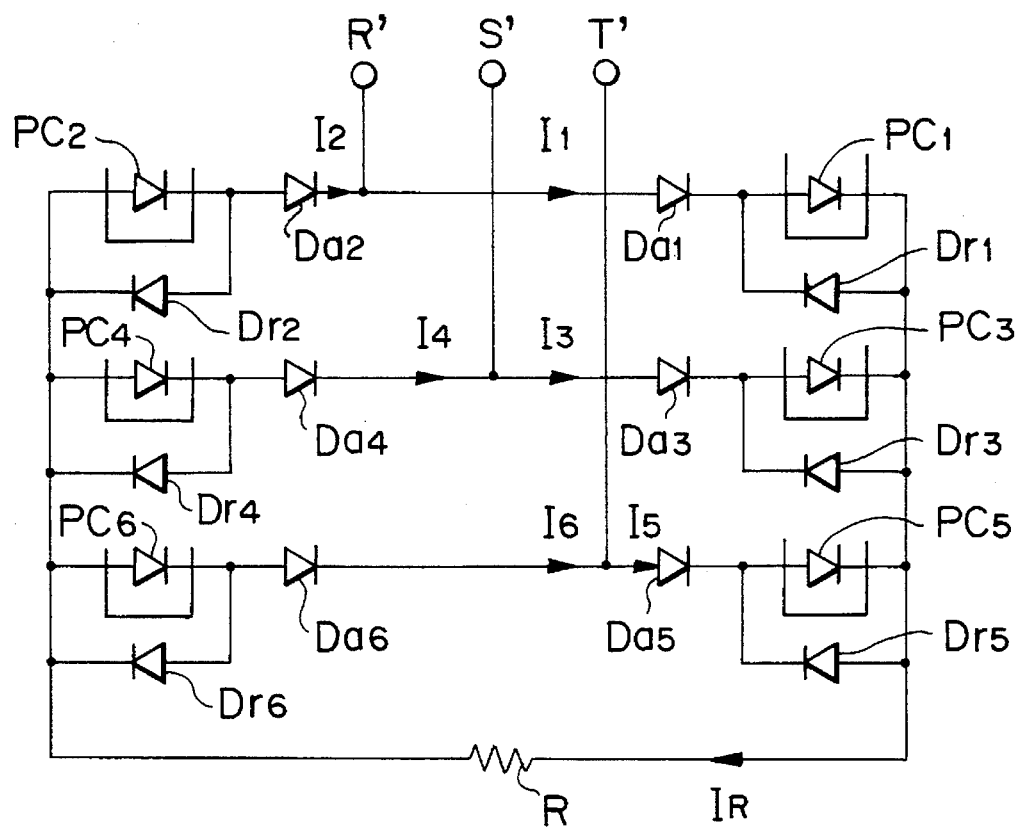
FIG. 12 is a circuit diagram of a synchronizing circuit in the regenerative rectifier circuit.

FIG. 12 shows details of the interior of the synchronizing circuit 56a. The three AC phase voltages are supplied to respective input terminals R', S' and T'. A set of secondary rectifier diodes Da1 to Da6 are connected to these AC phase voltages to form a secondary 3-phase full-wave rectifier whose configuration is identical to that of the main rectifier circuit which is formed by the main rectifier diodes DRP, DSP, DTP, DRN, DSN and DTN. However in addition, one of a set of photo-coupler light-emitting diodes PC1 to PC6 is connected in series with each of the diodes Da1 to Da6, such that the rectified current pulses which flow through each diode Da1 to Da6 will also flow through the corresponding one of the photo-coupler diodes PC1 to PC6, to thereby obtain current detection signals from the diodes PC1 to PC6. Each of the photo-coupler diodes PC1 to PC6 is shunted by a corresponding one of a set of protective diodes, Dr1 to Dr6, for voltage surge protection. The full-wave rectified DC voltage produced from the secondary rectifier circuit is applied across a resistor R as a resistive load, through which a load current $I_R$ flows. The aforementioned control signals 56a' are generated as respective photo-coupled current detection signals which are transferred from the set of photo-coupler diodes PC1, PC2, .... PC6 to the drive circuit 56b.

When rectified current flows through one of the photo-coupler diodes PC1 to PC6, a corresponding control signal is optically generated and supplied to the drive circuit 56b, which responds by generating a base drive signal whereby the corresponding one of the transistors QRP to QTN is set in the conducting state. Normally, rectified current flows in the forward direction of the corresponding one of the rectifier diodes, i.e. DRP. However if energy is generated by the motor 18 and transferred back to the DC rectifier circuit, then the energy can be transferred through transistor QRP (by current flow in the reverse direction to that through the diode DRP) into the AC voltage supply source 12, thereby preventing an increase in the rectified DC voltage level.

The overall operation of the regenerative rectifier circuit 56 is illustrated by the waveform diagram of FIG. 13, which shows waveforms of the full-wave rectification resistive load current $I_R$ and the rectified current pulses I1 to I6 generated within the synchronizing circuit 56a, and the corresponding base drive signals B1 to B6 which are generated by the drive circuit 56b in response to the photo-coupled output signals from the diodes PC1 to PC6 of the synchronizing circuit 56a. The functioning will be apparent from FIG. 13. For example, at a point when the AC supply phase voltage of terminal T is at a maximum positive value and the phase voltage of terminal R is at the most negative value, so that rectified currents I1 and I4 (flowing through the resistive load R) each attain maximum positive values, base drive signals B1 and B4 set the transistors QRP and QSN each in the ON state. In this condition, any energy which is sent back from the motor (i.e. in a direction tending to reverse-bias the rectifier diodes DRP, DSN) will be transferred through these transistors to the AC supply voltage source, thereby preventing a fluctuation of the DC voltage level.

The regenerative rectifier circuit of FIG. 11 has the advantage of a very simple control circuit configuration, by comparison with a prior art type of regenerative rectifier circuit, in which control of the reverse-current flow transistors is based upon monitoring to detect an increase in level of the rectified DC voltage. In addition, the circuit of FIG. 11 has the advantage that no adjustment is required, and that the amplitude of AC ripple components of the rectified DC voltage is maintained constant. This results in more effective operation of the AC power inverter apparatus, in eliminating the effects of the ripple components on the level of output AC voltage produced by the apparatus.

Although in the above embodiment the input AC phase voltages from the supply source are applied directly to the secondary rectifier diodes Da1 to Da6 of the secondary rectifier circuit, it should be understood that these phase voltages are used only as signals. Thus, it would be equally possible to apply to the secondary rectifier diodes respective low-value AC voltages which vary in synchronism with the AC source phase voltages, e.g. obtained from a 3-phase step-down transformer, thereby isolating the secondary rectifier circuit from the high AC source voltage levels.

Furthermore although in the above embodiment respective combinations of a transistor and a rectifier diode are utilized in the main rectifier circuit as respective controlled bi-directional current transfer elements, it would be possible to envisage the use of other types of element for that purpose. Whichever type is utilized, the essential point is that each controlled bi-directional current transfer element is set in the bi-directional conduction state only when forward current flows through the corresponding one of the secondary rectifier diodes.

A third embodiment of the present invention will be described referring to FIG. 14A. The operating principles of this embodiment are similar to those of the first embodiment described above, the main point of difference being that digital processing rather than analog signal processing is used with the third embodiment, in deriving the drive signals for the inverter section which produces the output 3-phase AC voltages.

Figure 14A:
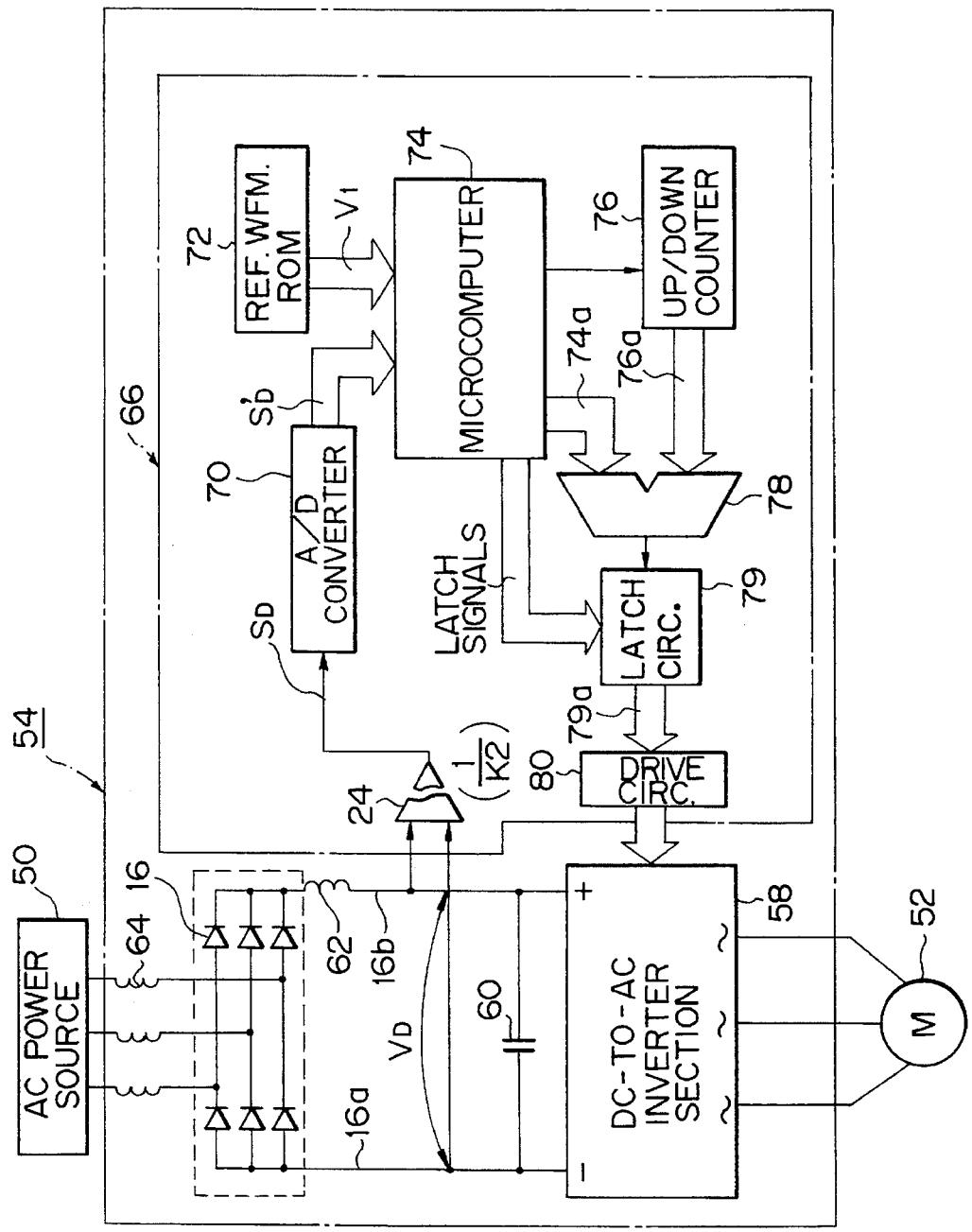
FIG. 14A is a block circuit diagram of a third embodiment of an AC inverter apparatus according to the present invention.

In FIG. 14A, the AC inverter apparatus 54 is connected between a 3-phase AC power source 50 and a 3-phase AC induction motor 52. The AC inverter apparatus 54 includes a 3-phase full-wave rectifier circuit 16, a DC-to-AC inverter circuit 58, a capacitor 60 (which, as for the first embodiment, is of only sufficient value to absorb transient voltage spikes, and is not a smoothing capacitor), an inductive reactor 62 (having a relatively small value of inductance, to assist in voltage transient elimination) and a noise filter 64. The 3-phase AC voltage from the AC power source 50 is connected to the rectifier circuit 16 via respective windings of the noise filter 64. The output DC voltage from the rectifier circuit 16 is supplied via a connecting lead 16a and through the reactor 62 and a connecting lead 16b, to the DC-to-AC inverter circuit 58, with the capacitor 60 being connected between the leads 16a, 16b. The 3-phase AC voltage outputs produced from the DC-to-AC inverter circuit 58 are supplied to the induction motor 52.

The control section 66 controls the operation of the DC-to-AC inverter circuit 58, and includes an amplitude detector 24, an A/D converter 70, a reference waveform ROM (read-only memory) 72, a microcomputer 74 and an up/down counter 76 which counts periods of a clock signal supplied from the microcomputer 74, to generate cyclically varying digital data which correspond to an analog signal having a triangular waveform. The control section 66 also includes a digital comparator 78 which compares successive data produced from the up/down counter 76 with data 74a produced from the microcomputer 74, and functions in conjunction with a latch circuit 79 to generate PWM drive signals 79a for input to a drive circuit 80. The drive circuit 80 generates respective 3-phase PWM drive signals for the DC-to-AC inverter circuit 58, as for the drive circuit 36 of the preceding embodiment, in accordance with the PWM signals 79a. The drive circuit 80 also serves to isolate the circuits of control section 66 from the high voltages within the inverter section 58.

The amplitude detector 24 has the same functions of electrical isolation and attenuation as that of the first embodiment described above. The voltage appearing between the leads 16a, 16b will be designated as $V_D$ and the resultant detected voltage signal derived by the amplitude detector 24 as $S_D$, while the instantaneous amplitude of the signal $S_D$ will be designated as Er so that, assuming the amplitude detector 24 provides attenuation by the factor K2, the instantaneous amplitude of the voltage $V_D$ will be K2·Er. The analog voltage signal $S_D$ from the amplitude detector 24 is converted to a digital signal $S_D'$ by the A/D converter 70, i.e. consisting of successive detected amplitude values each proportional to the sampled amplitude of the DC voltage $V_D$, which are supplied to the microcomputer 74. Successive digital data representing a reference waveform, which will be assumed to be a sinusoidal waveform having an instantaneous amplitude value V1, are read out from stored data in the reference waveform ROM 72. As for the first embodiment, the reference waveform is a target waveform that is required for the 3-phase AC voltage produced from the DC-to-AC inverter circuit 58. Also, since three AC phases are to be generated by the DC-to-AC inverter circuit 58, the reference waveform ROM 72 must generate successive data values representing three reference waveforms which are separated in phase by 120°, as for the waveform generator 26 of the first embodiment.

The up/down counter 76 is incremented at fixed intervals by the aforementioned clock signal, to periodically count up to a maximum count value, then count down to a minimum count value and so on cyclically. The output digital signal 76a from counter 76 therefore corresponds to the triangular waveform output signal 32a of the first embodiment described above. It can thus be understood that the process of deriving each of the PWM input signals to be applied to the drive circuit 80 with the third embodiment could be illustrated by a waveform diagram of the form of FIG. 3 described above, although in actuality, variations in digital data values would be represented. Each of the three output signals from the latch circuit 79 is a PWM signal which varies as illustrated in diagram (c) of FIG. 3, in accordance with changes in amplitude of the ripple-superimposed detection signal $S_D$. For brevity, such a diagram is omitted. The waveform diagrams 2 and 4 to 9 described above are also equally applicable to the third embodiment.

Considering for simplicity only one of the three AC phases, the microcomputer 74 generates an output data signal 74a for that phase (which corresponds in function to one of the three output signals $S_M$ from the dividers 30 in the first embodiment) by repetitively executing the following sequence of operations:

(a) Obtaining from the A/D converter 70 the instantaneous amplitude (Er) of the detection signal $S_D$, as a digital value.

(b) Obtaining the value of the amplitude factor (K1) which will determine the amplitude of the 3-phase AC voltage produced from inverter Circuit 58 (e.g. by reading a preset value K1 from an internal register of the microcomputer 74).

(c) Reading out from the ROM 72 the instantaneous amplitude value V1 of the reference waveform for that phase.

(d) Multiplying that value V1 by K1, to obtain V1·K1, and dividing the obtained value by the detected amplitude value Er, to obtain a ratio value V1·K1/Er.

(e) Supplying that ratio value to the digital comparator 78, (as one of the data 74a indicated in FIG. 14).

Figure 14B:
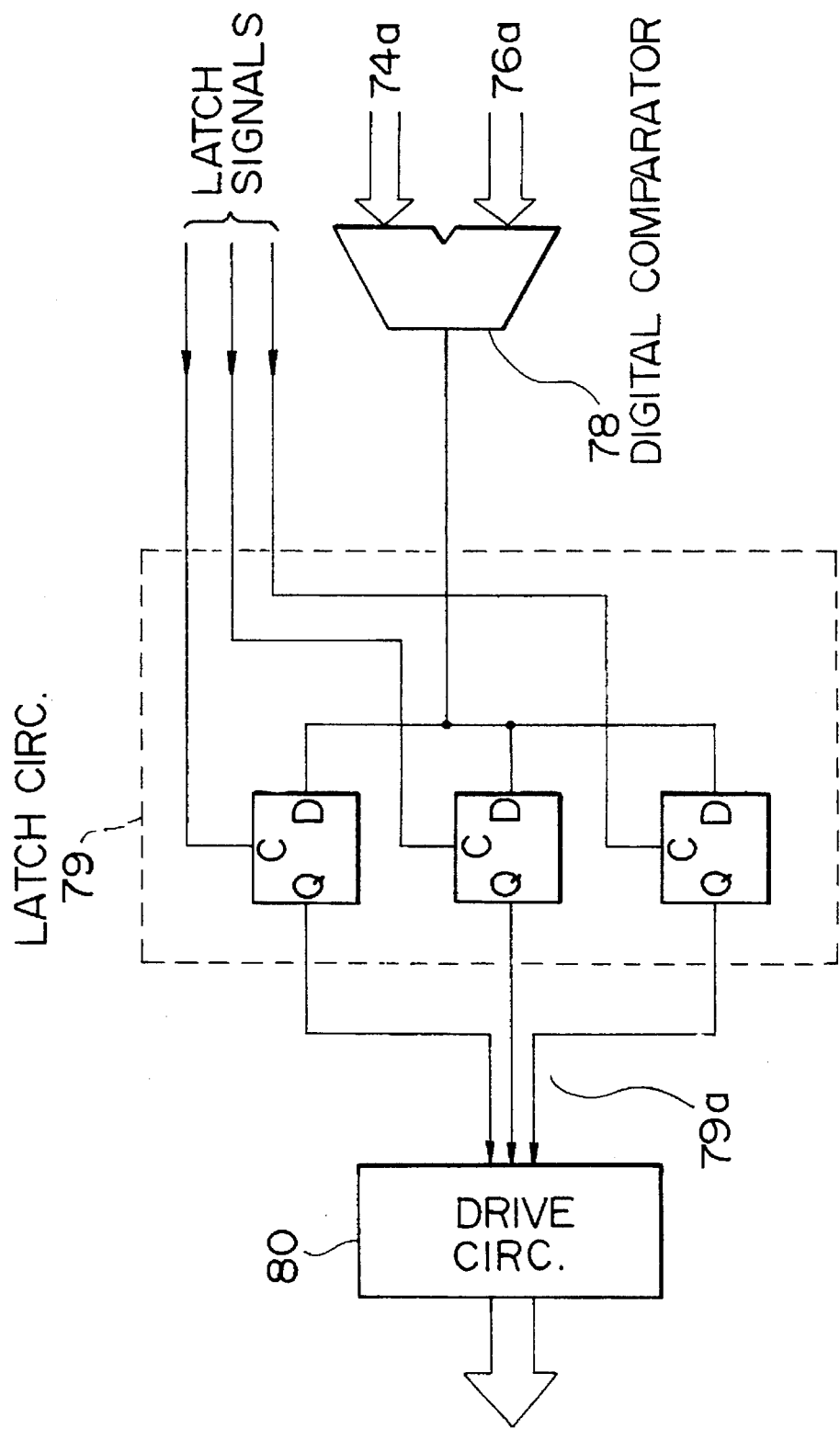
FIG. 14B shows details of a latch circuit in FIG. 14A.

That ratio value is then compared with the count value of the up/down counter 76 at that time point. The result of the comparison will be either a "1" or "0" decision bit. FIG. 14B shows details of the latch circuit 79. As illustrated, in synchronism with generating the data values 76a, the microcomputer 74 generates respective latch signals for the three AC phases, which are supplied to the latch circuit 79. When a decision bit is produced from the digital comparator 78, the corresponding one of the latch signals sets that bit into one of three D-type flip-flops which constitute the latch circuit 79, i.e. which respectively corresponding to the three AC phases.

The operating sequence described above is repetitively executed at fixed intervals, for each of the three AC phases. For example, after the sequence has been executed and an updated ("1" or "0", i.e. high or low) value has been set into the latch circuit 79 for one of the phases, the sequence is subsequently executed to obtain a new value for the second phase, then for the third phase, then for the first-mentioned phase, and so on. It can thus be understood that by executing such repetition at a rate which is sufficiently higher than the frequency of the output AC voltage from the inverter 58, the three output signals 79a which are obtained from the latch circuit 79 will constitute respective PWM input signals for three output AC voltage phases, in the same way as for the first embodiment. These PWM signals are supplied to the drive circuit 80, with each of these signals being modulated in accordance with the reference waveform, and with the modulation being compensated in accordance with the level of ripple appearing on the DC voltage from the rectifier circuit 16, in the same way as for the input signals $S_p$ of the first embodiment described above.

Figure 15:
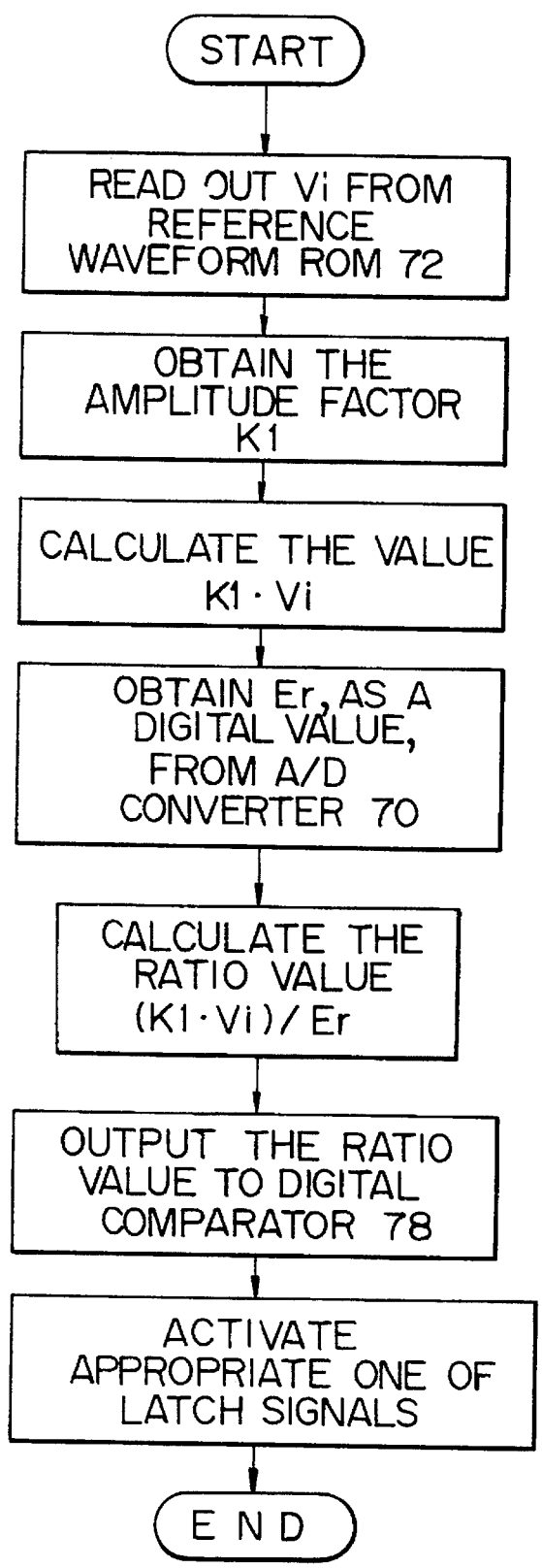
FIG. 15 is a flow diagram of operation of a microcomputer in the third embodiment.

FIG. 15 is a flow diagram illustrating the programed sequence of operations which is repetitively executed by the microcomputer 74 for each of the three phases, as described above. For each of the phases, the sequence is repetitively executed with a fixed period, which is in the range 50 to 100 microseconds. The opposite sequence of executing the multiplication and division operations can of course be used.

It should be noted that although it has been assumed for simplicity of description that the up/down counter 76, digital comparator 78, and latch circuit 79 are respectively separate from the microcomputer 74, it would of course in practice be possible to implement the functions of each of these by appropriate operation of a single microcomputer.

Although the third embodiment has been described for the case in which a simple 3-phase full-wave rectifier circuit 16 is utilized, it would be equally possible to utilize the regenerative rectifier circuit 56 of the present invention, described hereinabove.

A fourth embodiment of the invention will be described referring first to the block circuit diagram of FIG. 16, in which circuit sections corresponding to sections in the third embodiment of FIG. 14A are designated by identical reference numerals, with detailed description of these being omitted in the following. The AC inverter apparatus 110 of this embodiment includes a control section 112, in which an amplitude detector 24 derives a detection signal $S_D$ whose instantaneous amplitude is designated as Er, from the voltage $V_D$ produced from the rectifier circuit 16, and the signal $S_D$ is converted to a corresponding digital signal $S_D'$ by the A/D converter 70, to be supplied to a microcomputer 120. This embodiment differs essentially from the preceding embodiments in that a vector control drive method is used in generating the drive signals which are supplied via a drive circuit 122 to control the DC-to-AC inverter circuit 58. The control section 112 further includes a reference vector pattern ROM (read only memory) 118. The vector control drive method of this embodiment is based on the following sequence of steps, which is executed once in every fixed time period of duration t:

(a) Detecting a value proportional to the instantaneous amplitude of the rectified DC voltage $V_D$, i.e. as the value Er, as described for the preceding embodiments, and converting that to digital form;

(b) Obtaining an amplitude factor K1, which is preset to determine the output AC voltage amplitude produced by the DC-to-AC inverter circuit 58;

(c) Obtaining data representing a unit length vector (VRi) which forms part of a vector pattern expressing a reference 3-phase AC waveform;

(d) Calculating a duration ($t_x$) for which the vector will be applied, as $$t_x = t \times K1/Er$$

utilizing the aforementioned values for Er and K1, and setting a combination of states of the switching elements of the DC-to-AC inverter circuit 58 in accordance with that vector for the duration of that interval ($t_x$);

(e) Obtaining data representing a zero length vector, representing a condition in which there is zero potential difference between respective phases of the output 3-phase AC voltage from the DC-to-AC inverter circuit 58; and (f) Setting a combination of states of the switching elements of the DC-to-AC inverter circuit 58 in accordance with that zero length vector, during the remainder of the interval t, i.e. during ($t - t_x$).

The value of the factor K1 can be adjusted, to set the amplitude of output supply voltage from the AC power inverter apparatus to a desired value, with that amplitude varying in proportion to the value of K1.

With the method set out above, an output voltage vector pattern can be obtained which faithfully follows the shape of a reference vector pattern, (i.e. a spatial vector pattern) irrespective of the presence of AC ripple components in the rectified DC voltage from the rectifier circuit 16.

Figure 17:
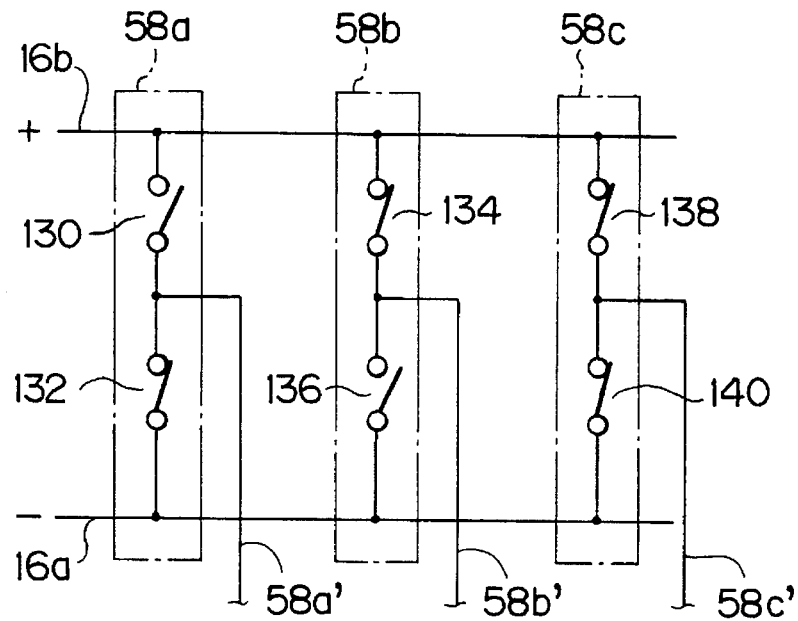
FIG. 17 is a circuit diagram of a DC-to-AC inverter circuit in the fourth embodiment.
Figure 18:
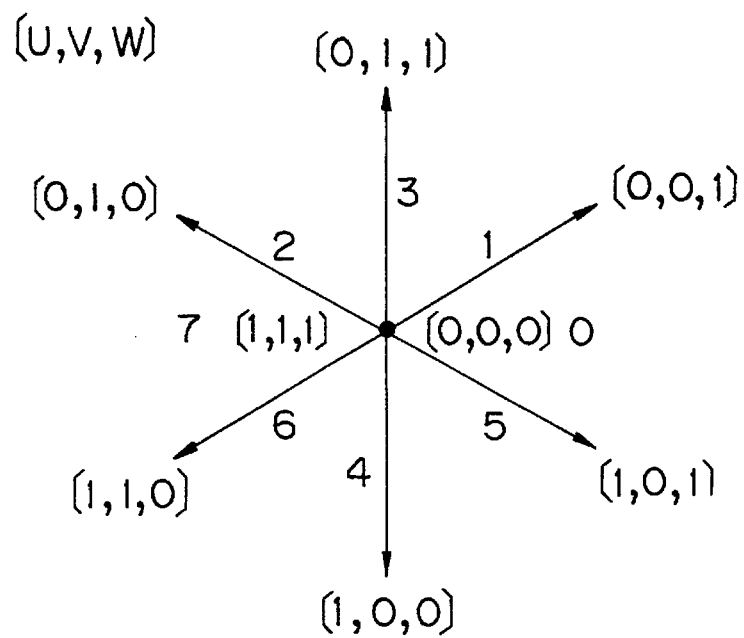
FIG. 18 is a vector diagram showing unit length vectors and zero length vectors.

FIG. 17 is a simplified equivalent circuit diagram of the DC-to-AC inverter circuit 58. As shown, this consists of three arms (respectively designated as 58a, 58b and 58c), with each of the arms being connected between the positive and negative DC supply leads 16a, 16b from the rectifier circuit 16, and with each arm consisting of two series-connected switching elements, e.g. the switching elements 130, 132 of arm 58a. One of three 3-phase AC output power lines 58a' is connected to the junction between the two switching elements 130, 132 of arm 58a, while the output power lines 58b' and 58c' are respectively connected to the junctions of the switching elements of the arms 58b, 58c as shown. The switching elements of each arm are controlled such that when one of the switching elements is in the open (ON) state, the other switching element is in the closed (OFF) state. In the following, when the upper switching element of an arm is in the ON state, then that condition will be designated as the "1" state of the arm, while when the upper switching element is in the OFF state then that condition will be designated as the "0" state of the arm. Hence, the various possible combinations of conditions of the three arms 58a, 58b, 58c can be expressed as follows:

(0, 0, 0), (0, 0, 1), (0, 1, 0), (0, 1, 1), (1, 0, 0), (1, 0, 1), (1, 1, 0), (1, 1, 1),

Thus there are a total of 8 combinations. Each of these combinations will be represented in the following as a vector, as shown in FIG. 18. The respective vectors will be designated by the numerals 0 to 7, i.e. the combination (0, 0, 0) being designated as vector 0, the combination (0, 0, 1) as vector 1, with these being respective zero length vectors, while the combination (0, 1, 0) will be designated as vector 2, the combination (0, 1, 1) as vector 3, the combination (1, 0, 0) as vector 4, the combination (1, 0, 1) as vector 5, the combination (1, 1, 0) as vector 6, and the combination (1, 1, 1) as vector 7, with these being respective unit length vectors. It is a feature of such a set of vectors, that a shift from one vector to an immediately adjacent vector is produced by a state change of the switching elements of only one of the arms.

Figure 19:
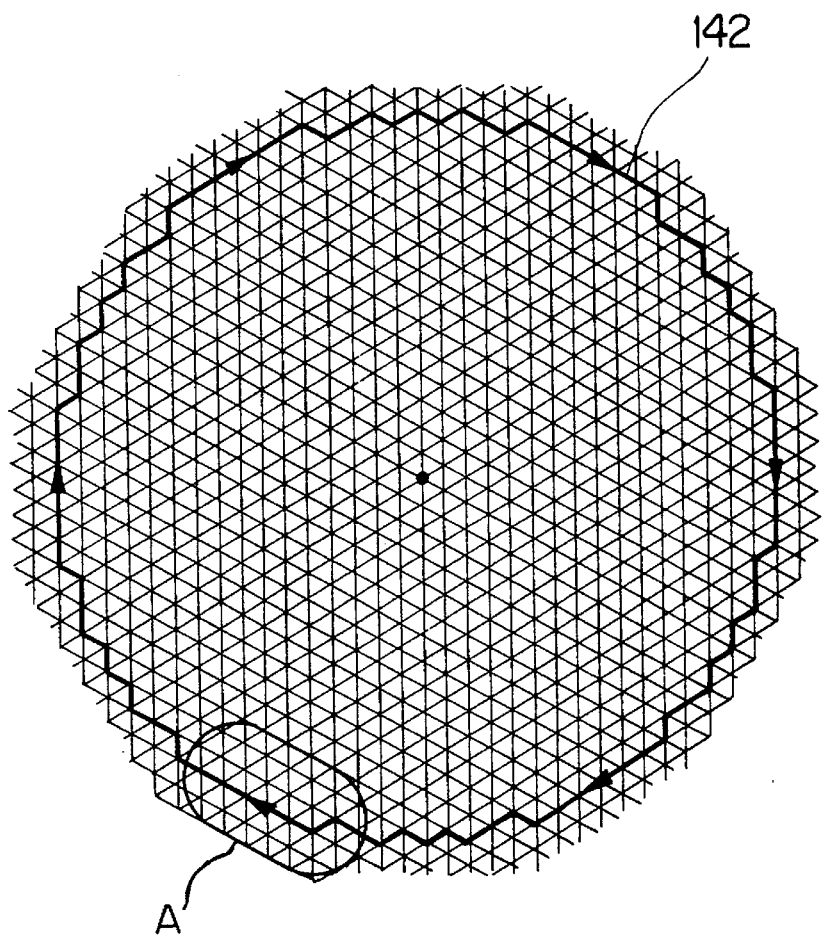
FIG. 19 shows a spatial vector pattern made up of vectors which are sequentially applied to establish respectively corresponding combinations of states of the switching elements of the fourth embodiment.

FIG. 19 shows a vector pattern 142, using a combination of the vectors of FIG. 18, which approximates to a circular shape. With this embodiment of the present invention, data corresponding to the combination of vectors 142 shown in FIG. 19 are stored in the reference vector pattern ROM 118, shown in FIG. 16. During operation of the apparatus, the successive vectors of the pattern are sequentially read out from the ROM 118. This corresponds to rotation around the pattern 142 of FIG. 19, and it will be assumed that the rotation is in the clockwise direction. Each time that a new vector is read out from the ROM 118, the microcomputer 120 responds by generating a corresponding set of drive input signals Vd, which are supplied to the microcomputer 120. The microcomputer 120 thereby generates a corresponding set of drive signals which control the respective switching elements of the arms 58a, 58b, 58c of the DC-to-AC inverter circuit 58 in accordance with the vector that is currently being read out from the ROM 118. It will be understood that in practical terms, if for example the vector number 4 shown in FIG. 18 is read out from the ROM 118, then drive signals will be generated from the drive circuit 122 whereby the upper switching element 130 of the arm 58a is set in the closed, i.e. ON state, (while the lower switching element 132 is of course set in the open state), and the upper switching elements 134, 138 are set in the opened, i.e. OFF state (with the lower switching elements of these arms in the ON state). After a specific time has elapsed in this condition, a succeeding vector is read out from the reference vector pattern ROM 118, and a new combination of the switching elements in the DC-to-AC inverter circuit 58 is accordingly established by the drive signals from the drive circuit 122.

It can be understood that the total time taken to successively read out and apply all of the sequence of vectors 142 of FIG. 19, i.e. to execute one complete rotation around the spatial vector pattern, determines the period of the AC supply voltage from the DC-to-AC inverter circuit 58.

Figure 20:
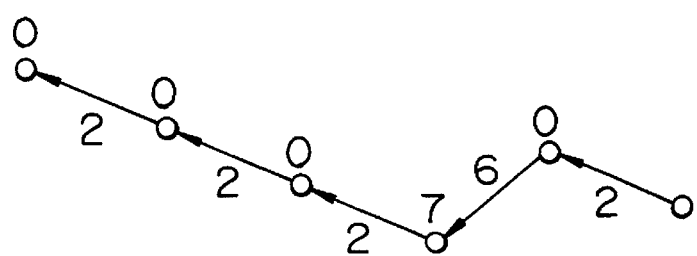
FIG. 20 shows details of a portion of the vector pattern of FIG. 19.

If the vector pattern 142 is cyclically executed in this way to generate the 3-phase AC voltage from the DC-to-AC inverter circuit 58, without inserting either of the zero length vectors (0 or 7) into that pattern, then the maximum value of that AC voltage will be obtained. With this embodiment, the output AC voltage level from the DC-to-AC inverter circuit 58 is adjusted by being controllably reduced from such a maximum value condition, by inserting the zero length vectors into the vector pattern 142, and by controlling the duration of the intervals for which the zero length vectors are applied. This is illustrated in FIG. 20, which shows a portion of the vector pattern 142 of FIG. 19, with zero length vectors (either the vector 0 or vector 7 as described above) inserted between each pair of unit length vectors in the pattern 142. Application of a zero length vector represents a condition in which all of the output AC voltage phases are at the same potential. In practical terms, this signifies a condition in which the upper switching elements of the arms 58a, 58b, 58c of the DC-to-AC inverter circuit 58 are all in the OFF state or are all in the ON state.

This output voltage control method will be described in more detail referring to FIG. 21. Each application of a unit length vector is followed by application of a zero length vector (number 0 or number 7). In FIG. 21, the total time which elapses between the start of applying a unit length vector (e.g. the start of reading out that vector from the ROM 118) until the start of applying the next unit length vector of the pattern 142, is designated as t. The time which elapses (within the interval t) from the start of applying a unit vector until the start of applying a succeeding zero length vector is designated as t1. The time which elapses (within the interval t) from the start of applying a zero length vector until the start of applying the succeeding unit length vector is designated as t2. Thus for example in FIG. 21, the unit length vector number 2 is first read out from the ROM 118 and the corresponding combination of switching element states in the DC-to-AC inverter circuit 58 is established, during a time interval t1, then the zero length vector number 0 is read out and applied during a time interval t2, then the unit length vector number 6 is applied during a time interval t1, the zero length vector number 7 is applied during a time interval t2, and so on.

It can thus be understood that by increasing the duration of each interval t2 and correspondingly shortening the value of each interval t1, the level of output AC voltage produced from the DC-to-AC inverter circuit 58 is accordingly reduced. Thus in this embodiment, assuming that the output AC frequency is constant, the value of the interval t is held fixed, and the ratio of t1 to t2 is varied to vary the output AC voltage level from the inverter apparatus. This embodiment therefore differs in that respect from the preceding embodiments, in which control of the duty factor of PWM drive signals, derived by employing a triangular waveform generating circuit and comparator circuit, is utilized to control the output AC voltage level. In other respects, the operation and configuration of this embodiment is similar to that of the embodiment of FIG. 14A.

Figure 16:
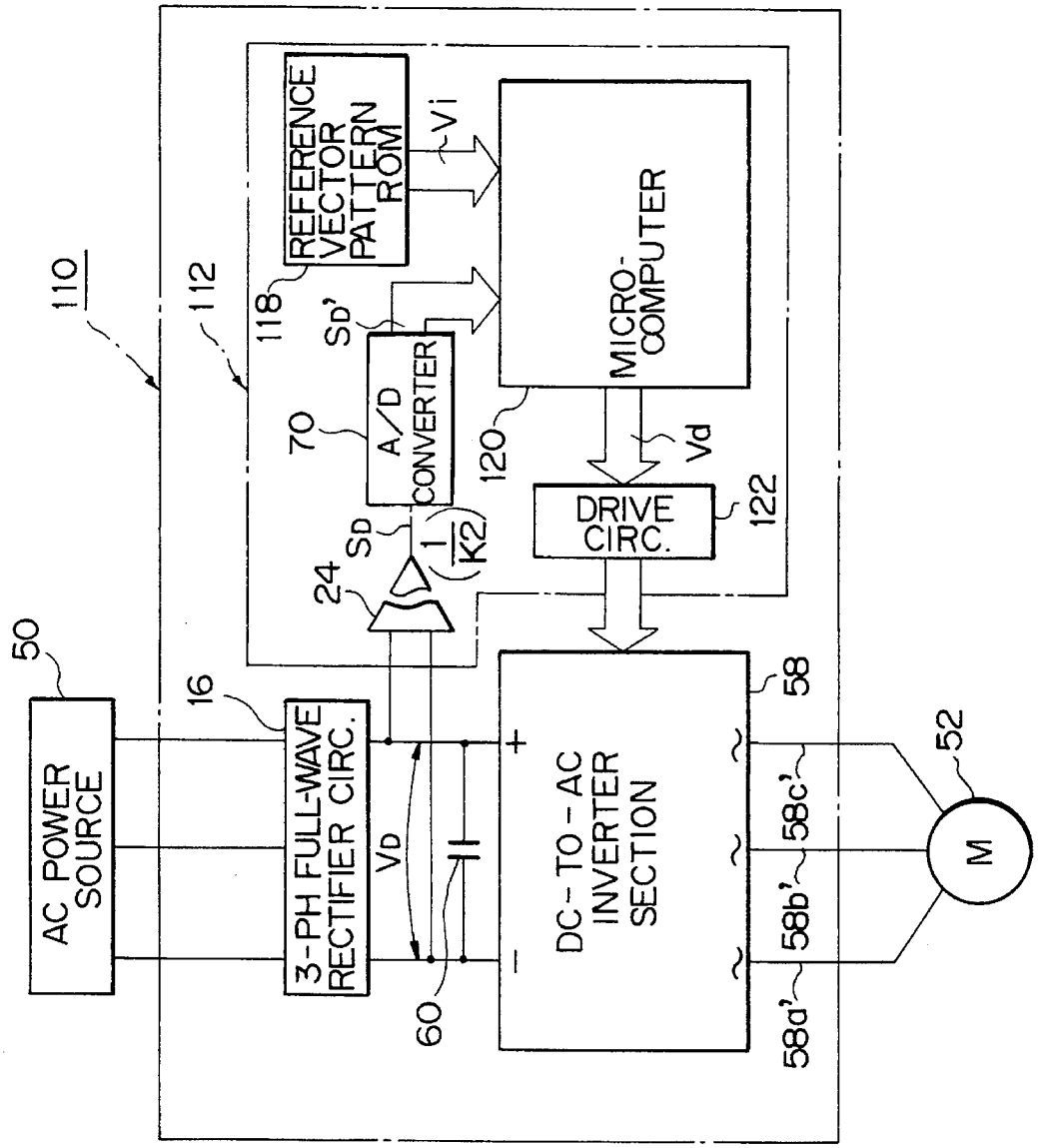
FIG. 16 is a block circuit diagram of a fourth embodiment of an AC inverter apparatus according to the present invention.

More specifically, referring to FIG. 16, the amplitude detection signal $S_D$, whose instantaneous amplitude represents that of the DC voltage produced from the rectifier circuit 16 multiplied by the factor 1/K2, is supplied to the A/D converter 70, and the corresponding digital amplitude values $S_D'$ are supplied from the A/D converter 70 to the microcomputer 120. As for the preceding embodiments, the instantaneous amplitude of the voltage signal $S_D$ varies in accordance with an AC ripple voltage superimposed on the unsmoothed DC voltage from the rectifier circuit 16. The reference vector pattern ROM 118 has a set of data stored therein which represent a spatial vector pattern which will be assumed to be the pattern 142 of FIG. 19, i.e. representing a specific cyclic sequence of alternating unit length vectors and zero length vectors, expressing a reference 3-phase AC voltage waveform. The microcomputer 120 executes the following operations once in each of successive time intervals t:

(1) The microcomputer 120 reads out from the ROM 118 the appropriate reference vector VRi for the current time interval, and also obtains the value Er, as a digital value;

(2) The microcomputer 120 then calculates the duration $t_x$ (i.e. the value of the interval t1 in FIG. 21) for which that vector is to be applied, based on the value of Er, the value of the time interval t shown in FIG. 21, and a preset amplitude factor K1. As for the preceding embodiments, the factor K1 can be preset by the user in accordance with the desired level of output AC supply voltage. $t_x$ is obtained as:

$$t_x=(K1 \times t)/Er$$

(3) The microcomputer 120 then generates a set of digital data values, as the drive input signals V0, in accordance with the vector VRi, and drive signals from the drive circuit 122 thereby control the switching elements of the arms 58a, 58b, 58c to establish the combination of ON/OFF states expressed by the vector VRi. That condition is continued for the calculated time duration $t_x$.

(4) The next vector is then read out from the ROM 118, which is a zero length vector, and corresponding drive signals are supplied from the drive circuit 122 to the DC-to-AC inverter circuit 58. That condition is continued for the remainder of the interval t (i.e. a duration of $t-t_x$).

The above sequence of steps is then repeated for the next t interval, with the next unit length vector of the pattern 142 being read out from the ROM 118, a new value of $t_x$ being calculated, for application of that unit length vector, and so on sequentially.

It should be noted that it would be equally possible to generate the reference vectors by processing executed by the microcomputer 120, rather than by using a ROM.

Figures 22A, 22B:
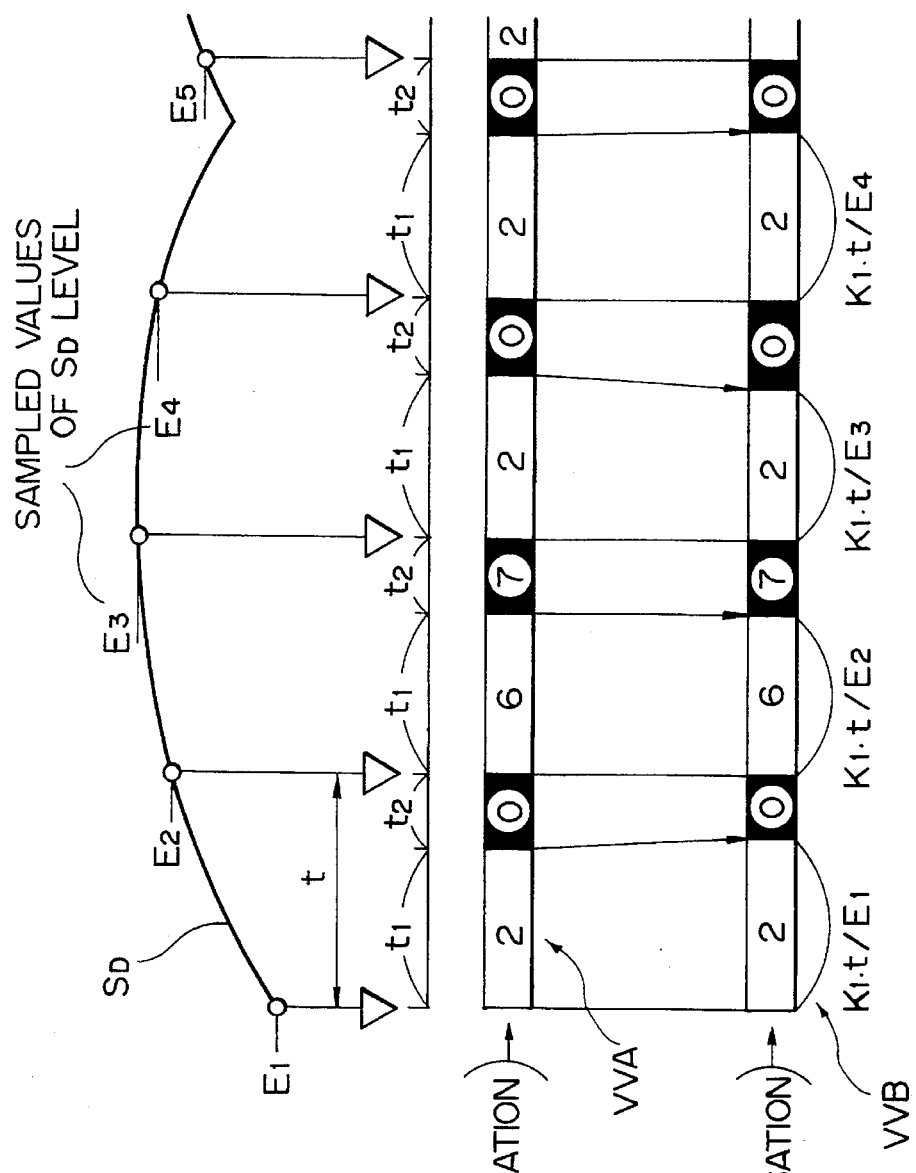
FIG. 22 is a diagram to illustrate how control of respective durations for which unit length vectors and zero length vectors are applied is utilized to compensate for AC ripple components, in the fourth embodiment.

FIG. 22 is a diagram for illustrating the DC ripple voltage elimination effect achieved by this embodiment. In FIG. 22, E1 to E5 designate successive sample values of the voltage signal $S_D$ from the amplitude detector 24, VVA designates a part of the vector pattern 142, assuming for the purposes of description that the ratio of t1 to t2 within each interval t is held fixed, and VVB designates that part of the vector pattern 142, with the ratio of t1 to t2 in each interval t in this case being varied in accordance with the sample values of the detection signal $S_D$, to achieve compensation for ripple components of that signal $S_D$. For simplicity of description, the rate of sampling the amplitude of signal $S_D$ is shown as much lower than the actual rate.

For example when the sample value E1 is obtained for the amplitude Er of signal $S_D$, then the microcomputer 120 calculates a corresponding value $t_x$ for the portion t1 of the next interval t, and the unit length vector number 2 is then applied for that duration $t_x$, with the zero length vector number 0 then being applied for the remainder of that interval t. Thus as indicated in the sequence VVB, the duration for which the zero length vector is applied is made shorter than would be the case if the ratio of t1 to t2 were to be held fixed. Thus, the effective amplitude of output AC voltage will be increased, by comparison with the case in which the ratio t1 to t2 is held fixed, i.e. the output AC voltage amplitude is adjusted in a direction tending to compensate for the relatively low amplitude (K2·E1) of the DC voltage produced from the rectifier circuit 16.

Conversely, when the sample value E3 is obtained, indicating that the DC voltage from the rectifier circuit 16 is relatively high in amplitude, the duration t1 in the next interval t (in which the unit length vector number 2 is applied) is made relatively short, with the duration t2 for which the next zero length vector (0) is applied being made correspondingly long. Hence, the output AC supply voltage from the DC-to-AC inverter circuit 58 is reduced, tending to compensate for the high value of E3.

It can thus be understood that with this embodiment, the ripple components which are superimposed on the DC output voltage from the rectifier circuit 16 are compensated and thereby prevented from affecting the amplitude of the output AC supply voltage from the DC-to-AC inverter circuit 58, by adjusting the ratio of the intervals t1 and t2 within each interval t to thereby vary the respective durations for which the unit length vectors are successively applied, in accordance with sample values representing instantaneous amplitude of the DC voltage from the rectifier circuit 16.

In establishing the vector pattern 142, either a number 0 or number 7 zero length vector is selected to be inserted following each unit length vector, with that selection being such as to ensure that a minimum number of changes in states of the switching elements will result from the change from applying the unit length vector to applying the zero vector. Thus for example in FIG. 20, the unit length vector number 2 is followed by the zero length vector number 0, whereas the unit length vector number 6 is followed by the zero length vector number 7, in the pattern sequence.

The shorter the duration of the aforementioned period t in relation to the period of the AC output voltage from the inverter apparatus, i.e. the greater the number of vectors constituting the circular vector pattern 142, the more closely will that pattern approximate to a circle, and the more closely will the AC output voltage waveform resemble the desired reference waveform.

Although the fourth embodiment has been described for the case in which a simple 3-phase full-wave rectifier circuit 16 is utilized, it would be equally possible to utilize instead the regenerative rectifier circuit described hereinabove.

It can be understood from the above description that an AC power inverter apparatus according to the present invention provides the basic advantage of eliminating the need for a large-value smoothing capacitor or inductive reactor to remove AC ripple caused by rectification of the AC power source voltage, thereby permitting the manufacturing cost and the overall size and weight of such an apparatus to be substantially reduced, while enabling the operating lifetime of the apparatus to be increased. In addition, such an AC power inverter apparatus has the advantage of presenting a high value of power factor to the AC power source, without requiring the use of an inductive reactor.

What is claimed is:

1. An AC power inverter apparatus for converting an input AC voltage supplied from an AC power source to an output AC voltage, comprising:

AC-to-DC converter means for converting said input AC voltage to a DC voltage having AC ripple components;

amplitude detection means (24) for deriving an amplitude detection signal, said amplitude detection signal varying in accordance with changes in amplitude of said DC voltage;

reference waveform generating means (26) for generating a reference waveform signal from a reference waveform, said reference waveform signal varying in accordance with changes in amplitude of the reference waveform;

operational means (30) for operating on said reference waveform signal and said amplitude detection signal to obtain a ratio signal, said ratio signal varying in amplitude in accordance with a ratio of said amplitude of the reference waveform to said amplitude of the DC voltage;

pulse width modulation signal generating means (32, 34) for operating on said ratio signal to generate a pulse width modulation signal, said pulse width modulation signal varying in duty factor in accordance with changes in said amplitude of the ratio signal; and a DC-to-AC inverter circuit, controlled by said pulse width modulation signal for converting said DC voltage to said output AC voltage;

said DC-to-AC inverter circuit being controlled by said pulse width modulation signal such as to compensate the amplitude of said output AC voltage for changes in said DC voltage amplitude, to thereby compensate against said ripple components.

2. An AC power inverter apparatus according to claim 1, wherein said pulse width modulation signal generating means comprising:

triangular waveform generating means for generating a triangular waveform signal having a fixed period; and a comparator circuit for comparing said triangular waveform signal with said ratio signal, to obtain said pulse width modulation signal.

3. An AC power inverter apparatus according to claim 2, wherein said operational means comprises divider means for dividing amplitude values expressed by said reference waveform signal by amplitude values expressed by said amplitude detection signal.

4. An AC power inverter apparatus according to claim 3, wherein said amplitude detection signal is an analog signal varying in amplitude (Er) in proportion to said DC voltage amplitude, wherein said reference waveform signal is an analog signal varying in amplitude (Vi) in proportion to said reference waveform amplitude, wherein said triangular waveform signal is an analog waveform signal and said comparator means is formed of an analog voltage comparator.

5. An AC power inverter apparatus according to claim 3, further comprising analog-to-digital conversion means for converting said amplitude detection signal to successive digital data expressing successive sample values of instantaneous amplitude of said DC voltage, wherein said reference waveform generating means functions to generate said reference waveform signal as successive digital data expressing successive values of instantaneous amplitude of said reference waveform, wherein said triangular waveform generating means is formed of a reversible counter circuit for generating cyclically increasing and decreasing digital data values as said triangular waveform signal, and wherein said comparator means is formed of a digital comparator.

6. An AC power inverter apparatus according to claim 1, further comprising means for generating an amplitude factor (K1) which is presettable in magnitude in accordance with a desired value of amplitude of said output AC voltage from said AC power inverter apparatus, and means for multiplying said reference waveform signal by said amplitude factor.

7. An AC power inverter apparatus for converting an input AC voltage supplied from an AC power source to an output AC voltage, comprising:

AC-to-DC converter means for converting said input AC voltage to a DC voltage having AC ripple components;

amplitude detector means (24) for deriving an amplitude detection signal, said amplitude detection signal varying in accordance with changes in amplitude of said DC voltage;

analog-to-digital converter means (70) for converting said amplitude detection signal to digital data;

reference waveform memory means (72) for generating data values representing a reference waveform and for storing therein successive digital sample values of amplitude of the reference waveform;

a microcomputer coupled to obtain, at each of periodically occurring time points, a detected amplitude value (Er) from said analog-to-digital converter means and a waveform amplitude value (V1) read out from said memory means, for multiplying said waveform amplitude value by a presettable amplitude factor (K1), and dividing a product obtained thereby by said detected amplitude value (Er), to obtain a ratio value (K1·V1/Er);

a reversible counter circuit (76) for generating data representation a triangular waveform having cyclically increasing and decreasing values of data representing changes in amplitude of the triangular waveform;

digital comparator means (78) for comparing each said ratio value with a count value of said reversible counter circuit, to obtain successive comparison bits, and latch means for latching said comparison bits to produce a pulse width modulation signal; and a DC-to-AC inverter circuit receiving said DC voltage and controlled by said pulse width modulation signal for converting said DC voltage to said output AC voltage;

said DC-to-AC inverter circuit being controlled by said pulse width modulation signal to compensate the amplitude of said output AC voltage against changes in said DC voltage amplitude, to thereby compensate against said ripple components.

8. An AC power inverter apparatus for converting an input AC voltage supplied from an AC power source to an output 3-phase AC voltage, comprising:

AC-to-DC converter means for converting said input AC voltage to a DC voltage having AC ripple components;

amplitude detection means (24) for deriving an amplitude detection signal, said amplitude detection signal varying in accordance with changes in amplitude of said DC voltage;

analog-to-digital converter means (70) for converting said amplitude detection signal to digital data;

a DC-to-AC inverter circuit (58) formed of a plurality of controllable switching elements, for converting said DC voltage to said output 3-phase AC voltage, and supplying respective phases thereof to three output terminals (58a', 58b', 58c');

reference vector memory means (118) having stored therein data representing a reference pattern of vectors, said pattern expressing a reference waveform of said output 3-phase AC voltage, said vectors including unit length vectors and zero length vectors, each said zero length vector representing a condition of zero potential difference between respective phases of said output 3-phase AC voltage;

a microcomputer coupled to take in, at successive time points recurring with a fixed period (t), a detected digital amplitude value (Er) from said analog-to-digital converter means, a preset amplitude factor (K1), and a unit length vector read out from said reference vector memory means, for producing during a first portion (t1) of said fixed period (t) a combination of control signals (Vd) in accordance with said unit length vector, for then reading out from said reference vector memory means a zero length vector and producing during a second portion (t2) of said fixed period (t) a combination of control signals (Vd) in accordance with said zero length vector, and for determining the ratio of said first and second portions (t1, t2) in accordance with a ratio of said preset amplitude factor (K1) to said detected amplitude value (Er); and a drive circuit coupled to said DC-to-AC inverter circuit and responsive to each said combination of control signals for generating a corresponding combination of drive signals, for setting said plurality of switching elements to a combination of states in accordance with said combination of control signals;

said microcomputer functioning during each said fixed period (t) to increase said second time period portion (t2) in relation to said first portion (t1) in accordance with an increase in said DC voltage amplitude as expressed by said detected amplitude value, for thereby compensating said output 3-phase AC voltage against said ripple components.

9. An AC power inverter apparatus according to claim 7, wherein said microcomputer functions in each said fixed period (t) to compute a value ($t_x$) for said first portion (t1) as:

$$t_x = K1 \cdot t/Er,$$

where K1 is said presettable amplitude factor and Er is said detected digital amplitude value.

10. An AC power inverter apparatus according to any of claims 1, 7 or 8, wherein said AC-to-DC converter means is a regenerative rectifier circuit, comprising:

a plurality of main rectifier diodes interconnected to form a main rectifier circuit, for transferring power from said AC power source to said DC-to-AC inverter circuit by forward current flow through said rectifier diodes;

a plurality of current transfer elements each connected in parallel with a corresponding one of said rectifier diodes; and synchronizing means operating in synchronism with said input AC voltage from the AC power source, for controlling each of said current transfer elements to selectively permit transfer of power from said DC-to-AC inverter circuit by current flow through said current transfer elements in the inverse direction to said forward current flow.

11. An AC power inverter apparatus according to claim 10 wherein each of said current transfer elements is a transistor which is connected in parallel with a corresponding one of said main rectifier diodes and wherein said synchronizing means is formed of a synchronizing circuit and a drive circuit, said synchronizing circuit comprising:

a plurality of secondary rectifier diodes connected to form a secondary rectifier circuit which is coupled to rectify said AC input voltage;

a resistor connected as a resistive load to said secondary rectifier circuit; and a plurality of current detection elements, each connected to generate a current detection signal in response to a flow of forward current through a corresponding one of said secondary rectifier diodes;

wherein said drive circuit is responsive to each of said current detection signals for supplying a drive signal to a corresponding one of said transistors, for thereby setting said transistor in a conducting state in which current flow is enabled through said transistor in said inverse direction.

12. A method of operating a control circuit of an AC power inverter apparatus, said AC power inverter apparatus including an AC-to-DC converter circuit for converting an input AC voltage from a power supply source to a DC voltage having AC ripple components, and a DC-to-AC inverter circuit, said DC-to-AC inverter circuit being controlled by a pulse width modulation drive signal produced from said control circuit to convert said DC voltage to an output AC voltage while compensating said output AC voltage against effects of said AC ripple components, said method comprising execution at each of periodic intervals of a sequence of steps of:

(a) obtaining a detected instantaneous amplitude value (Er) proportional to said DC voltage;

(b) reading out, from a memory, one (V1) of a sequence of stored reference waveform instantaneous amplitude values;

(c) obtaining a preset amplitude factor (K1) indicative of a desired amplitude of said output AC voltage;

(d) calculating the product of said reference waveform instantaneous amplitude value (V1) and said amplitude factor (K1), and dividing said product by said detected instantaneous amplitude value (Er) to obtain a ratio value;

(e) comparing said ratio value with a current count value of a counter whose count state is successively incremented and successively decremented in alternating intervals, to obtain a comparison value; and (f) latching said comparison value in a latch circuit to thereby obtain said pulse width modulation signal as an output signal from said latch circuit, with said pulse width modulation signal having a duty factor which decreases in accordance with an increase in said DC voltage resulting from said ripple components.

13. A method of operating a control circuit of an AC power inverter apparatus, said AC power inverter apparatus including an AC-to-DC converter circuit for converting an input AC voltage from a power supply source to a DC voltage having AC ripple components, and a DC-to-AC inverter circuit formed of a plurality of switching elements, for converting said DC voltage to an output 3-phase AC voltage, said method comprising execution in each of successive intervals recurring with a fixed period (t) of a sequence of steps of:

(a) obtaining a detected instantaneous amplitude value (Er) proportional to said DC voltage;

(b) obtaining data representing one unit length vector of a reference pattern of vectors, said reference pattern expressing a reference waveform of said output 3-phase AC voltage;

(c) obtaining a preset amplitude factor (K1) indicative of a desired amplitude of said output 3-phase AC voltage;

(d) generating a combination of drive signals determined in accordance with said unit length vector, during a first portion (t1) of said fixed period (t), determining the duration of said first portion (t1) in proportion to the ratio of said amplitude factor (K1) to said detected instantaneous amplitude value (Er), and supplying said drive signals to establish a corresponding combination of states of said switching elements during said first portion (t1);

(e) obtaining data representing a zero length vector, corresponding to a condition of zero potential difference between respective phases of said output 3-phase voltage; and (f) generating a combination of drive signals determined in accordance with said zero length vector, and supplying said drive signals to establish a corresponding combination of states of said switching elements during a remaining portion (t2) of said fixed period (t).

* * * * *